(12) United States Patent
Kawamoto et al.

(10) Patent No.: US 10,646,774 B2
(45) Date of Patent: *May 12, 2020

(54) HANDHELD INFORMATION PROCESSING APPARATUS, STORAGE MEDIUM AND INFORMATION PROCESSING METHOD

(71) Applicant: Nintendo Co., Ltd., Kyoto (JP)

(72) Inventors: Koichi Kawamoto, Kyoto (JP);
Kanako Tsugihashi, Kyoto (JP);
Ryutaro Takahashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 106 days.

This patent is subject to a terminal disclaimer.

(21) Appl. No.: 15/966,095

(22) Filed: Apr. 30, 2018

(65) Prior Publication Data

US 2018/0243645 A1 Aug. 30, 2018

Related U.S. Application Data

(63) Continuation of application No. 12/955,183, filed on Nov. 29, 2010, now Pat. No. 10,022,620.

(30) Foreign Application Priority Data

May 26, 2010 (JP) ................................ 2010-120099

(51) Int. Cl.
*A63F 13/211* (2014.01)
*A63F 13/95* (2014.01)
(Continued)

(52) U.S. Cl.
CPC .......... *A63F 13/211* (2014.09); *A63F 13/428* (2014.09); *A63F 13/92* (2014.09);
(Continued)

(58) Field of Classification Search
None
See application file for complete search history.

(56) References Cited

U.S. PATENT DOCUMENTS 6,213,872 B1 * 4/2001 Harada ................. A63B 24/00
463/7
2001/0007827 A1 7/2001 Horikawa
(Continued)

FOREIGN PATENT DOCUMENTS

| JP | 2001-184472 | 6/2001 |
| JP | 2001-190848 | 6/2001 |

(Continued)

OTHER PUBLICATIONS

Japanese Office Action in Application No. 2010-120099 dated Jun. 24, 2014 (with translation).

(Continued)

*Primary Examiner* — John C Kuan
(74) *Attorney, Agent, or Firm* — Nixon & Vanderhye, P.C.

(57) ABSTRACT

A game apparatus as a handheld information processing apparatus includes a CPU, and when the game apparatus is closed, the CPU shifts to a sleep mode. When a user carries the game apparatus in the sleep mode, a micon measures step counts according to a magnitude of accelerations indicated by acceleration data from an acceleration sensor. When a main power of the game apparatus is turned on to display a main menu screen, the step counts are converted into earned coins, for example. In each of a plurality of applications to be executed by the game apparatus, a special item is purchased, or game playing on a special course is permitted by utilizing the earned coins.

19 Claims, 18 Drawing Sheets

(51) Int. Cl.
*A63F 13/92* (2014.01)
*A63F 13/428* (2014.01)

(52) U.S. Cl.
CPC ........ *A63F 13/95* (2014.09); *A63F 2300/105* (2013.01); *A63F 2300/1012* (2013.01); *A63F 2300/204* (2013.01)

(56) References Cited

U.S. PATENT DOCUMENTS

| | | |
|---|---|---|
| 2002/0125328 A1 | 9/2002 | Sukeda et al. |
| 2003/0008714 A1 | 1/2003 | Tajiri et al. |
| 2006/0025282 A1* | 2/2006 | Redmann ............ A61B 5/103 482/8 |
| 2006/0258420 A1 | 11/2006 | Mullen |
| 2007/0060353 A1 | 3/2007 | Omori et al. |
| 2007/0173321 A1 | 7/2007 | Shen et al. |
| 2007/0197274 A1 | 8/2007 | Dugan |
| 2007/0218988 A1 | 9/2007 | Lucich |
| 2008/0182724 A1* | 7/2008 | Guthrie ............ A61B 5/1118 482/8 |
| 2009/0048493 A1 | 2/2009 | James et al. |
| 2009/0264172 A1* | 10/2009 | Morimura ............ A63F 13/06 463/7 |
| 2009/0303204 A1 | 12/2009 | Nasiri et al. |
| 2009/0309859 A1 | 12/2009 | Nishi et al. |
| 2010/0069148 A1 | 3/2010 | Cargill |
| 2010/0083116 A1 | 4/2010 | Akifusa et al. |
| 2010/0087250 A1 | 4/2010 | Chiu |
| 2010/0125028 A1 | 5/2010 | Heppert |

FOREIGN PATENT DOCUMENTS

| | | |
|---|---|---|
| JP | 2003-111980 | 4/2003 |
| JP | 2003-141260 | 5/2003 |
| JP | 2003-316905 | 11/2003 |
| JP | 2008-110241 | 5/2008 |
| JP | 2009-254539 | 11/2009 |
| JP | 2010-046347 | 3/2010 |
| JP | 2010-085868 | 4/2010 |
| JP | 2010-097553 | 4/2010 |

OTHER PUBLICATIONS

Communication received in European Application No. 10 193 313.3-1906 dated Feb. 23, 2015.

\* cited by examiner

FIG. 2
(A) TOP VIEW (FOLDED STATE)
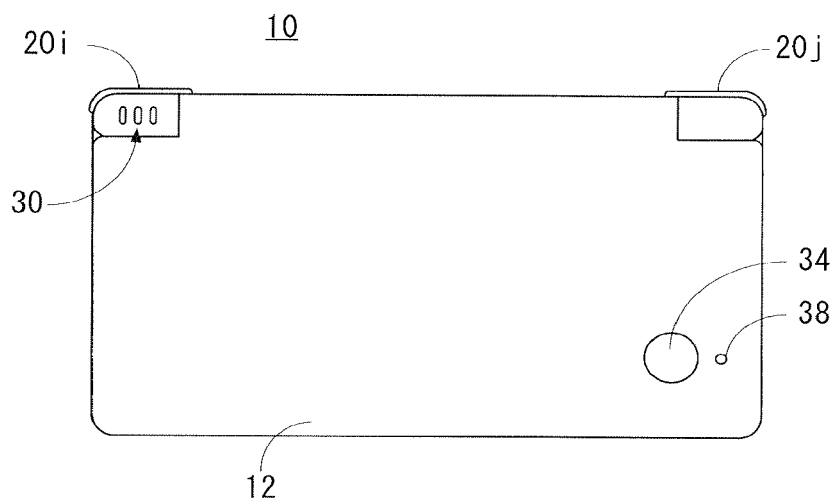
(B) SIDE SURFACE VIEW (FOLDED STATE)
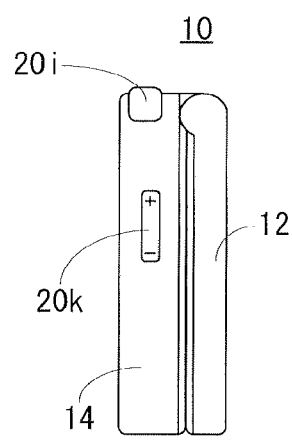

FIG. 4
(A) MAIN MANU SCREEN  200
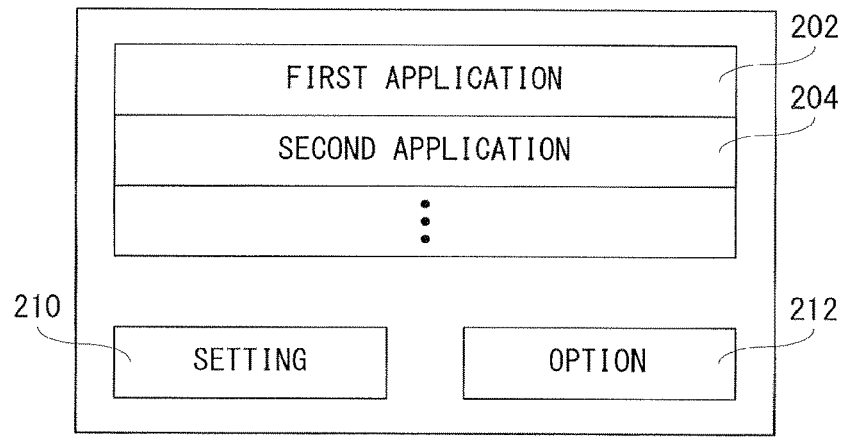
(B) ITEM PURCHASING SCREEN 300
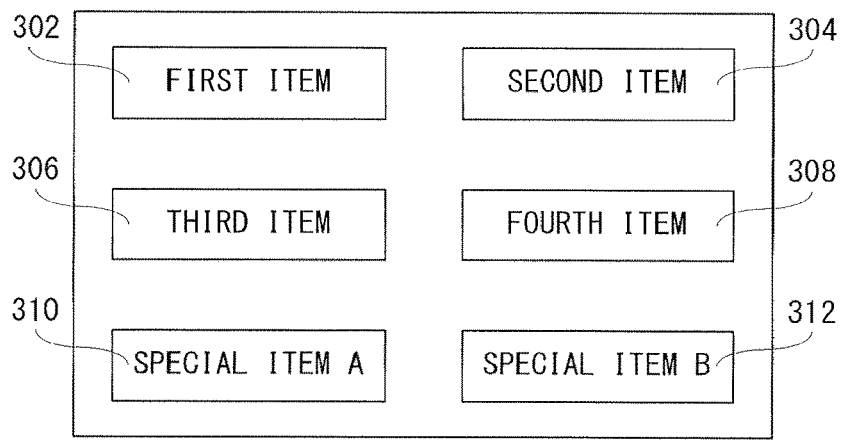
(C) COURSE SELECTING SCREEN 400
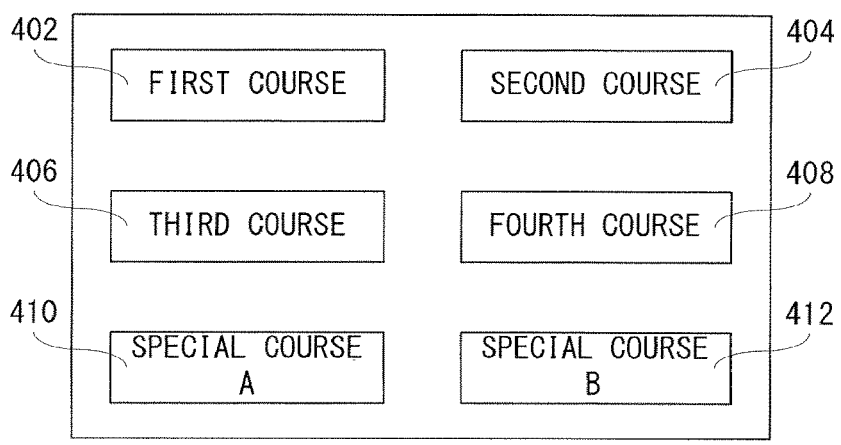

HANDHELD INFORMATION PROCESSING APPARATUS, STORAGE MEDIUM AND INFORMATION PROCESSING METHOD

CROSS REFERENCE OF RELATED APPLICATION

This application is a continuation of U.S. patent application Ser. No. 12/955,183 filed Nov. 29, 2010, and which claims priority to Japanese Patent Application No. 2010-120099, the entirety of each of which are incorporated herein by reference.

BACKGROUND OF THE INVENTION

Field of the Invention

The present invention relates to a handheld information processing apparatus, a storage medium and an information processing method. More specifically, the present invention relates to a handheld information processing apparatus, a storage medium and an information processing method that have a memory unit storing a plurality of applications.

Description of the Related Art

One example of a conventional handheld information processing apparatus of this kind is disclosed in Japanese Patent Application Laid-Open No. 2003-316905 [G06F 17/60] (Document 1) laid-open on Nov. 7, 2003. In a point system according to the Document 1, step counts are converted into points, and depending on the number of points, a desired service can be selected from a plurality of services. More specifically, the user walks with an electric pedometer to thereby measure step counts, and when the electric pedometer is connected to a cellular phone, the measured step counts are transmitted to a WEB server from which points are given. The points thus given are accumulated, and the accumulated points are used for a discount for the fee of athletic club, a discount of costs for shopping and eating and drinking at the club, a discount of a specific site of the Internet, and a discount at general store.

Furthermore, another example of a handheld information processing apparatus of this kind is disclosed in Japanese Patent Application Laid-Open No. 2009-254539 [A63F 13/00] (Document 2) laid-open on Nov. 5, 2009. In the game system of the Document 2, by transmitting a plurality of step count data measured by a plurality of pedometers are transmitted to game apparatuses by wireless communications, various games by using the plurality of step count data can be executed among the game apparatuses. For example, a game whose content changes depending on the number of players walking at the same time and a game whose content changes depending on the sum of the step counts by the plurality of players are disclosed.

However, in the point system of the Document 1, in order to utilize the step counts measured by the pedometer in the various services, the step count data is transmitted to another device by a communication or the like, and then, by utilizing the other devices, the service is required to be utilized.

Similarly, in the game system of the Document 2, in order to use the step counts measured by the pedometer in the various games, step count data is transmitted to the server by a communication, and then, the game is required to be played.

SUMMARY OF THE INVENTION

Therefore, it is a primary object of the present invention to provide a novel handheld information processing apparatus, a novel storage medium and a novel information processing method.

It is another object of the present invention to provide a handheld information processing apparatus, a storage medium and an information processing method that make it easy to use the measured step counts by a plurality of applications.

A first invention is a handheld information processing apparatus having a memory unit storing a plurality of applications, and comprises a step count measurer, an accumulator, an application executor, and a utilizer. The step count measurer measures step counts. The accumulator converts the step counts measured by the step count measurer into a step count correlation value in correlation with the step counts and accumulates the same. The application executor executes any one of the application out of the plurality of applications stored in the memory unit. The utilizer utilizes the step count correlation value accumulated by the accumulator in each of the applications to be executed by the application executor.

According to the first invention, the accumulated step count correlation value is utilized by each of the plurality of applications, and this makes it easy to utilize the measured step counts among the plurality of applications. Furthermore, the memory unit storing a plurality of applications, the step count measurer and the accumulator are provided within a single apparatus, and therefore, it is possible to easily utilize the accumulated step count correlation value in each of the plurality of applications. A second invention is according to the first invention, wherein the memory unit has a shared data area to which all the plurality of applications are accessible and a plurality of application-dedicated data area which is set for each of the plurality of applications, and to which only the relevant application is accessible. The accumulator stores the step count correlation value in the shared data area. The utilizer reads and utilizes the step count correlation value stored in the shared data area, and writes update information (game data, etc.) acquired therefrom to a corresponding application-dedicated data area.

According to the second invention, the step count correlation value is commonly utilized, and the update information of the application in which the step count correlation value is used is written to the data area dedicated to each application, and therefore, it is possible to prevent the updated information from being illegally used. Furthermore, by utilizing the common step count correlation value, it is possible to update the data dedicated to each application.

A third invention is according to the first invention, wherein the application executor changes a content of the execution between when the step count correlation value is utilized by the utilizer and when not utilized.

According to the third invention, a content of the execution is changed between when the step count correlation value is utilized and when not utilized, and therefore, it is possible to execute different game processing, for example, and increase an interest of the user or the player. Furthermore, it becomes possible to motivate the user or the player to have a willingness to walk.

A fourth invention is according to the first invention, further comprising a determiner which determines whether or not the step count correlation value accumulated by the accumulator is above a first predetermined number, and the accumulator sets the step count correlation value to the first predetermined number when the determiner determines that the step count correlation value is above the first predetermined number. That is, the step count correlation value is restricted to the first predetermined number.

According to the fourth invention, the step count correlation value is restricted to the first predetermined number, and therefore, it is possible to relatively reduce the difference between the user who can walk a lot and the user who cannot, capable of decreasing the sense of unfairness.

A fifth invention is according to the fourth invention, further comprising a step count storage which adds date and time information to the step counts measured by the step count measurer, and stores the same in the memory unit. The determiner determines whether or not the step count correlation value acquired by converting the step counts on the same day is above a second predetermined number being smaller than the first predetermined number. Furthermore, the accumulator accumulates the step count correlation value of the second predetermined number when the determiner determines that the step count correlation value is above the second predetermined number. That is, the step count correlation value that can be converted a day is restricted to the second predetermined number.

According to the fifth invention, the step count correlation value that can be converted a day is restricted to the second predetermined number, and therefore, it is possible to urge the user to continuously walk appropriately.

A sixth invention is according to the first invention, further comprising a switcher which switches the information processing apparatus between an unused state and an used state, and a switch determiner which determines whether or not the used state switches to the unused state. The step count measurer measures step counts when the switch determiner determines that a switch to the unused state is made. That is, the step count measurer measures step counts when the information processing apparatus is not in use.

According to the sixth invention, the apparatus can be used as a pedometer when the user or the player does not use it.

A seventh invention is according to the sixth invention, wherein the switcher switches between a power-saving mode and a normal mode. The switch determiner determines whether or not the used state switches to the unused state by determining whether or not the normal mode changes to the power-saving mode.

According to the seventh invention as well, the apparatus can be used as a pedometer when the user or the player does not use it.

An eighth invention is according to the sixth invention, further comprising: an inactivator which inactivates the application executor. The switcher switches from the used state to the unused state in response to the application executor being inactivated by the inactivator.

In the eighth invention as well, the apparatus can be used as a pedometer when the user or the player does not use it.

A ninth invention is according to the sixth invention, wherein an apparatus main body has a function capable of being opened and closed. For example, the cover of the apparatus is opened or closed, or the apparatus itself is opened or closed. The switcher switches the apparatus main body between a closed state and an opened state. The switch determiner determines whether or not the used state switches to the unused state by determining whether or not the apparatus main body is switched from the opened state to the closed state. More specifically, the switch determiner determines a state that the apparatus main body is opened as a used state and a state that the apparatus main body is closed as unused state.

In the ninth invention as well, the apparatus can be used as a pedometer when the user or the player does not use it.

A tenth invention is according to the sixth invention, further comprising a communicator. The communicator intermittently executes communication processing while step counts are measured by the step count measurer. That is, the communicator transmits, receives, and transmits and receives data.

According to the tenth invention, when the user or the player does not use the appliance, communication processing of transmitting, receiving and transmitting and receiving data is executed, and therefore, it is possible to collect data from other apparatuses and access points, and transmit data to other apparatuses and access points. In addition, the communication processing is performed while step counts are measured, and therefore, while the user or the player carries the apparatus outside, communications are performed with other apparatuses carried by other users or players and access points placed on the street while they are unaware. Accordingly, it is possible to give a user surprise and interest and motivate the user to have a willingness to walk.

An eleventh invention is according to the first invention, further comprising a condition determiner which determines whether or not a predetermined condition is satisfied. The accumulator converts the step counts measured by the step count measurer into a step count correlation value when the condition determiner determines that the predetermined condition is satisfied.

According to the eleventh invention, when the predetermined condition is satisfied, the steps count are converted into the step count correlation value, and therefore, it is possible to prevent processing load for conversion from being heavy needlessly.

A twelfth invention is a storage medium storing an information processing program of a handheld information processing apparatus having a memory unit storing a plurality of applications. The information processing program causes a computer of the information processing apparatus to function as a step count measurer which measures step counts; an accumulator which converts the step counts measured by the step count measurer into a step count correlation value in correlation with the step counts and accumulates the same; an application executor which executes any one of the application out of the plurality of applications stored in the memory unit; and a utilizer which utilizes the step count correlation value accumulated by the accumulator in each of the applications to be executed by the application executor.

In the twelfth invention as well, similar to the first invention, it becomes possible to easily utilize the measured step counts among a plurality of applications.

A thirteenth invention is an information processing method of a handheld information processing apparatus having a memory unit storing a plurality of applications, a computer of the information processing apparatus including following steps of: (a) measuring step counts; (b) converting the step counts measured by the step (a) into a step count correlation value in correlation with the step counts and accumulating the same; (c) executing any one of the application out of the plurality of applications stored in the memory unit; and (d) utilizing the step count correlation value accumulated by the step (b) in each of the applications to be executed by the step (c).

In the thirteenth invention as well, similar to the first invention, and therefore, it becomes possible to easily utilize the measured step counts among a plurality of applications.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a top and a left side surface of the game apparatus in a folded state shown in FIG. 1;

FIG. 4 is an illustrative view showing examples of screens to be displayed on a first LCD or a second LCD of the game apparatus shown in FIG. 1-FIG. 3;

DETAILED DESCRIPTION OF THE PREFERRED EMBODIMENTS

Figure 1:
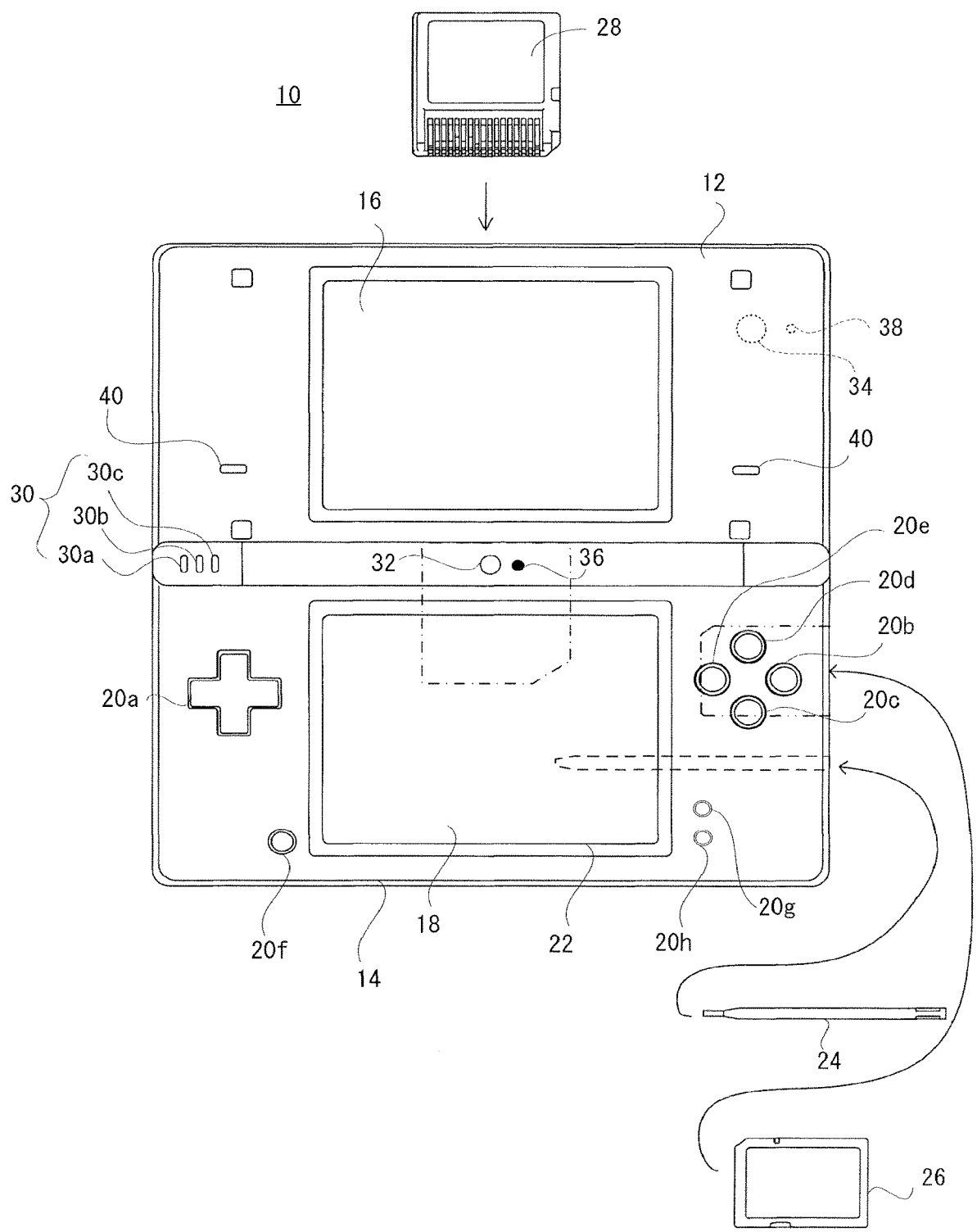
FIG. 1 is an illustrative view showing one embodiment of an external configuration of a game apparatus of this invention.

Referring to FIG. 1, a game apparatus 10 of an embodiment of the present invention includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding handheld game apparatus, and in FIG. 1, the game apparatus 10 is shown in an opened state (in an open state). The game apparatus 10 is constructed such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at the arbitrary angle.

Additionally, the game apparatus 10 is mounted with a camera (32, 34) described later, functioning as an imaging device, such as imaging an image with the camera (32, 34), displaying the imaged image on the screen, and saving the imaged image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

As shown in FIG. 1 and FIG. 2, the lower housing 14 is provided with respective operation buttons 20a-20k as input devices. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2(B), the volume button 20k is provided on the left side surface of the lower housing 14.

FIG. 2(A) is an illustrative view of the game apparatus 10 in a folded manner as seen from a top surface (upper housing 12). FIG. 2(B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in this embodiment, the L button 20i and the R button 20j can also be used for an operation of an imaging instruction (shutter operation). The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is further provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot and the housing portion for the touch pen 24 need not be provided.

Moreover, on the right side surface of the lower housing 14, a loading slot for housing a memory card 26 (represented by a chain double-dashed line in FIG. 1) is provided. Inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot as well, a connector (not illustrated) for electrically connecting the game apparatus 10 and the memory card 28 is provided. The memory card 28 is a recording medium of recording an information processing program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

Although illustration is omitted, a switch (opening and closing switch 42: see FIG. 3) that is switched in response to opening and closing of the game apparatus 10 is provided inside the hinge. For example, the opening and closing switch 42 is turned on when that the game apparatus 10 is in an opened state. On the other hand, the opening and closing switch 42 is turned off when that the game apparatus 10 is in a closed (folded) state. Here, it is only necessary to know that the game apparatus 10 is in the opened state or the closed state, and therefore, turning on and off of the opening and closing switch 42 may be reversed.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the second LCD 18, an operation explanatory screen for teaching the user how the respective operation buttons 20a-20k and the touch panel 22 work or how to operate them, and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2(A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are opposite with each other. For example, the user holding the game apparatus 10 can image a landscape (including the user, for example) as the user is seen from the game apparatus 10 with the inward camera 32, and can image a landscape as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position for housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are constituted to image an image, and the first LCD 16 as a displayer for mainly displaying the imaged image and a game screen. On the other hand, the lower housing 14 is provided with the input device (operation button 20 (20a-20k) and the touch panel 22) for performing an operation input to the game apparatus 10 and the second LCD 18 as a displayer for mainly displaying an operation explanatory screen and a game screen. Accordingly, the game apparatus 10 has two screens (16, 18) and two kinds of operating portions (20, 22).

Figure 3:
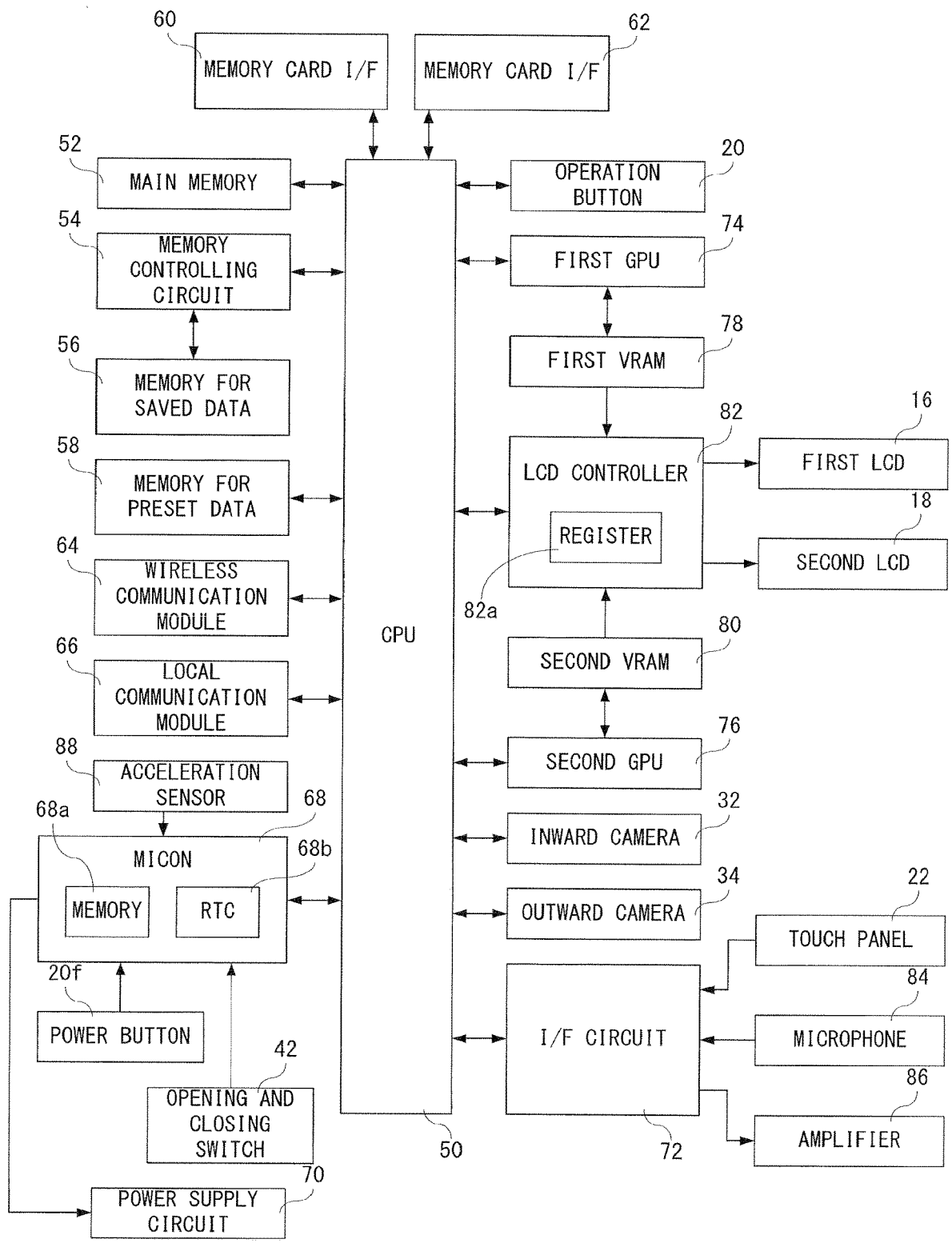
FIG. 3 is a block diagram showing an electric configuration of the game apparatus shown in FIG. 1 and FIG. 2.

FIG. 3 is a block diagram showing an electric configuration of the game apparatus 10 of this embodiment. As shown in FIG. 3, the game apparatus 10 includes electronic components, such as a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a micon 68, a power supply circuit 70, an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing described later by executing the predetermined program.

Here, the program to be executed by the CPU 50 may be previously stored in the memory within the game apparatus 10, acquired from the memory card 26 and/or 28, and acquired from another appliance by communicating with the other appliance.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another appliance). In this embodiment, as a main memory 52, a PSRAM (Pseudo-SRAM) is used, for example. The memory for saved data 56 is a memory means for storing (saving) a program to be executed by the CPU 50, data of images imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the images imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 are read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with the micon 68. The micon 68 includes a memory 68a and an RTC 68b. The memory 68a is a RAM, for example, and stores a program and data for a control by the micon 68. The RTC 68b counts a time. In the micon 68, date and a current time, etc. can be calculated on the basis of the time counted by the RTC 68b.

The micon 68 is connected with the power button 20f, the opening and closing switch 42, the power supply circuit 70, and the acceleration sensor 88. A power-on signal is given to the micon 68 from the power button 20f. When the power button 20f is turned on in a state that the main power supply of the game apparatus 10 is turned off, the memory 68a functioning as a BootROM of the micon 68 is activated to perform a power control in response to opening and closing of the game apparatus 10 as described later. On the other hand, when the power button 20f is turned on in a state that the main power supply of the game apparatus 10 is turned on, the micon 68 instructs the power supply circuit 70 to stop supplying power to all the circuit components (except for the micon 68). Here, the power supply circuit 70 controls the power supplied from the power supply (typically, a battery housed in the lower housing 14) of the game apparatus 10 to supply power to the respective circuit components of the game apparatus 10.

Furthermore, from an opening and closing switch 42, a power-on signal or a power-off signal is applied to the micon 68. In a case that the main power supply of the game apparatus 10 is turned on in a state that the opening and closing switch 42 is turned on (the main body of the game apparatus 10 is in an opened state), a mode in which a power is supplied from the power supply circuit 70 to all the circuit components of the game apparatus 10 under the control of the micon 68 (hereinafter referred to as "normal mode") is set. In the normal mode, the game apparatus 10 can execute an arbitrary application and is in use by a user or a player (used state).

Furthermore, in a case that the opening and closing switch 42 is turned off in a state that the power supply of the game apparatus 10 is turned on (the main body of the game apparatus 10 is in a closed state), a mode in which a power is supplied from the power supply circuit 70 to a part of the components of the game apparatus 10 (hereinafter referred to as "sleep mode") is set. In the sleep mode, the game apparatus 10 cannot execute an arbitrary application and is not in use (unused state) by the user. In this embodiment, the part of the components is the CPU 50, the wireless communication module 64, and the micon 68. Here, in the sleep mode (sleep state), the CPU 50 basically sets a clock in a stopped (inactivated) state, resulting in less power consumption. Additionally, in the sleep mode, a power supply to the CPU 50 may be stopped. Accordingly, in this embodiment, in the sleep mode, an application is never executed by the CPU 50 as described above.

It should be noted that in a case that a communication is executed by the wireless communication module 64 in the sleep state, the CPU 50 is activated by a control signal from the wireless communication module 64. That is, by the wireless communication module 64, the clock of the CPU 50 is operated, and then, the wireless communication module 64 instructs the CPU 50 to start a communication. This holds true hereunder. Then, the CPU 50 instructs the micon 68 to start supplying power to the memory controlling circuit 54 and the memory for saved data 56. Accordingly, it is possible to transmit data stored in the memory for saved data 56 to another game apparatus 10, etc. and store data received from another game apparatus 10, etc. in the memory for saved data 56, by a communication.

Furthermore, in a case that step count data (acummulative step count data 152c described later) is output from the micon 68 in the sleep state, the CPU 50 is activated by a control signal from the micon 68. That is, the clock of the CPU 50 is activated by the micon 68 to notify the output of the step count data. Furthermore, the micon 68 controls the power supply circuit 70 to start supplying electric power to the memory controlling circuit 54 and the memory for saved data 56. Accordingly, the step data output from the micon 68 is stored in the memory for saved data 56.

In addition, when the sleep state is canceled (non-sleep state) due to the game apparatus 10 being opened, and so forth, a power-off signal is input to the micon 68 from the opening and closing switch 42. Thus, the micon 68 activates the CPU 50 to notify the CPU 50 of the cancelation of the sleep state. In response thereto, the CPU 50 instructs the micon 68 to cancel the sleep state. That is, under the instruction from the CPU 50, the micon 68 controls the power supply circuit 70 to start supplying electric power to all the circuit components. Thus, the game apparatus 10 shifts to the normal mode to enter the used state.

Moreover, as described above, the micon 68 is connected with the acceleration sensor 88. For example, the acceleration sensor 88 is a three-axis acceleration sensor, and provided inside the lower housing 14 (the upper housing 12 may be possible). This detects an acceleration in a direction vertical to the surface of the first LCD 16 (second LCD 18) of the game apparatus 10, and accelerations in two crosswise directions (longitudinal and laterally) that are parallel to the first LCD 16 (second LCD 18). The acceleration sensor 88 outputs a signal as to the detected acceleration (acceleration signal) to the micon 68. The micon 68 can detect a direction of the game apparatus 10, and a magnitude of the shake of the game apparatus 10 on the basis of the acceleration signal. Accordingly, it is possible to make the micon 68 and the acceleration sensor 88 function as a pedometer, for example. The pedometer using the acceleration sensor 88 is already known, and therefore, the detailed content is omitted, but the step counts are measured in correspondence with the magnitude of the acceleration.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, the touch position data is data indicating coordinates of a position where an input is performed on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where an input is made.

The operation button 20 is made up of the aforementioned respective operation buttons 20a-20k (except for the power switch 22f. This hold true for the following), and is connected to the CPU 50. The operation data indicating an input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to instructions from the CPU 50, and output image data corresponding to the imaged images to the CPU 50. In this embodiment, the CPU 50 issues an imaging instruction to any one of the inward camera 32 and the outward camera 34 while the camera (32, 34) which has received the imaging instruction images an image and transmits the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78. The second GPU 76 similarly generates a second display image according to an instruction form the CPU 50, and draws the same in the second VRAM 80. The first VRAM 78 and the second VRAM 80 are connected to the LCD controller 82.

The LCD controller 82 includes a register 82a. The register 82a stores a value of "0" or "1" according to an instruction from the CPU 50. In a case that the value of the register 82a is "0", the LCD controller 82 outputs the first display image drawn in the first VRAM 78 to the second LCD 18, and outputs the second display image drawn in the second VRAM 80 to the first LCD 16. Furthermore, in a case that the value of the register 82a is "1", the LCD controller 82 outputs the first display image drawn in the first VRAM 78 to the first LCD 16, and outputs the second display image drawn in the second VRAM 80 to the second LCD 18.

For example, such a game apparatus 10 executes in-passing communication processing when being set to a sleep mode. Here, the in-passing communication processing is briefly explained. In the sleep mode, the wireless communication module 64 transmits (broadcasts) a signal (connection request signal) indicating a connection request to another game apparatus 10, and tries to receive a connection request signal from another game apparatus 10 each predetermined time (30 ms, for example). That is, communication processing is intermittently executed. Thus, another game apparatus 10 being a communication partner is searched (scanned). Here, the connection request signal includes identifying information of the game apparatus 10 being a transmission source.

At this time, when receiving the connection request signal, the game apparatus 10 transmits a connection permission signal to the game apparatus 10 being a transmission source of the connection request signal in response thereto. Here, the connection permission signal includes identifying information of the game apparatus 10 being a transmission source. This makes it possible to confirm each other's existences between the two game apparatuses 10 to thereby establish a communication state between them.

Here, in the game apparatus 10 that transmits the connection permission signal in response to the connection request signal, the wireless communication module 64 activates the CPU 50 to start supplying electric power from the power supply circuit 70 to the memory controlling circuit 54 and the memory for saved data 56 under the control of the micon 68 according to an instruction from the CPU 50. Similarly, in the game apparatus 10 which receives the connection permission signal, the wireless communication module 64 activates the CPU 50 to start supplying electric power from the power supply circuit 70 to the memory controlling circuit 54 and the memory for saved data 56 under the control of the micon 68 according to an instruction from the CPU 50.

When a communication state is established, data set (decided) in advance, such as game data, message data, etc. is transmitted or received, or transmitted and received between the two game apparatuses 10.

Although the detailed illustration is omitted, when the in-passing communication is ended, each game apparatus 10 returns to the sleep state.

Accordingly, when the player or the user walks with the game apparatus 10 in the sleep state, a communication (in-passing communication) with another game apparatus 10 is executed without any operation to thereby acquire data, such as game data, message data from this another game apparatus 10.

Here, a case that the in-passing communication processing with another game apparatus 10 is executed is explained, but the in-passing communication processing may be executed with a predetermined access point. In such a case, game data, message data, etc. that are transmitted from the access point can be acquired.

Although the detailed explanation is omitted, in a case that in-passing communication is executed, out of the two game apparatuses 10 that establish the connection state, the game apparatus 10 that transmits a connection request signal functions as a parent machine, and the game apparatus 10 that transmits a connection permission signal in response to the connection request signal functions as a child machine.

Furthermore, in the sleep mode, the game apparatus 10 functions as a pedometer, and in a case that the player or the user walks with the game apparatus 10 as described above, the number of step counts of the player or the user is counted. The counted step count is reflected on the processing of the application program to be executed by the game apparatus 10 as necessary.

For example, in the memory for saved data 56 shown in FIG. 3, application programs as to a plurality of applications can be stored. When the main power supply of the game apparatus 10 is turned on, a main menu screen 200 for selecting an application, etc. as shown in FIG. 4(A) is displayed on the second LCD 18 (first LCD 16 may be possible).

Here, although detailed description is omitted, in a case that each application is ended as well, the main menu screen 200 is displayed. As shown in FIG. 4(A), on the main menu screen 200, a plurality of button images 202, 204, . . . for selecting an application are provided, and below it, button images 210, 212 for selecting various settings and options are provided. The user or the player turns on the button images 202, 204, . . . to thereby select a desired application.

When the button image 202 is turned on, for example, a first application is selected. In a situation in which an item is purchased during the game according to a program (first application program) of the first application, a screen (item purchasing screen) 300 as shown in FIG. 4(B) is displayed on the second LCD 18 (even the first LCD 16 may be possible).

On the item purchasing screen 300, button images 302, 304, 306, 308, 310, 312 are displayed. For example, the button images 302 to 308 are provided for selecting an item (normal item: the first to fourth items) which the player (user) or the player character can purchase by using coins (hereinafter referred to as "normal coin") acquired in the game. Furthermore, the button image 310 and the button image 312 are provided for selecting an item (special items A, B) by using the earned coin (hereinafter referred to as "earned coin") depending on the measured step counts.

Although detailed description is omitted, the number of normal coins required to purchase the first to fourth items and the number of earned coins required to purchase the special items A, B are decided in advance. Naturally, in a case that the player (user) or the player character does not have the required number of normal coins or more and the required number of earned coin or more, he or she cannot purchase the first to fourth items or the special items A, B.

Furthermore, when the button image 204 is turned on on the main menu screen 200 shown in FIG. 4(A), the second application is selected. For example, at a start (restart) of the game according to the program of the second application (second application program), in the situation in which a course is selected, a screen (course selecting screen) 400 as shown in FIG. 4(C) is displayed on the second LCD 18 (the first LCD 16 may be possible).

On the course selecting screen 400, button images 402, 404, 406, 408, 410, 412 are displayed. For example, the button images 402 to 408 are provided for selecting the course (normal course: the first to fourth courses) capable of selecting without using the earned coins. Furthermore, the button image 410 and the button image 412 are provided for selecting the course (special course A, B) capable of playing with the user of an earned coin.

Although detailed description is omitted, the number of earned coins required to play on the special courses A, B is decided in advance. Naturally, in a case that the player (user) or the player character does not have the required number of earned coins or more, he or she cannot play the game on the special course A, B.

Here, if a playable state on the special course A, B is established by using the earned coin once, the game is playable without limitation, or the playable number and the playable period may be set.

Thus, the earned coin obtained by converting the step counts can commonly be used in the processing of a plurality of different applications programs. Here, for simplicity, explanation is made when the earned coins are used in the processing of the two application programs, but the earned coins can be used in the processing of the different three or more application programs. Here, the application programs need not be stored (installed) in the memory for saved data 56, may be read from the memory cards 26, 28 attached to the game apparatus 10, or may be downloaded from the external appliances.

Figure 5:
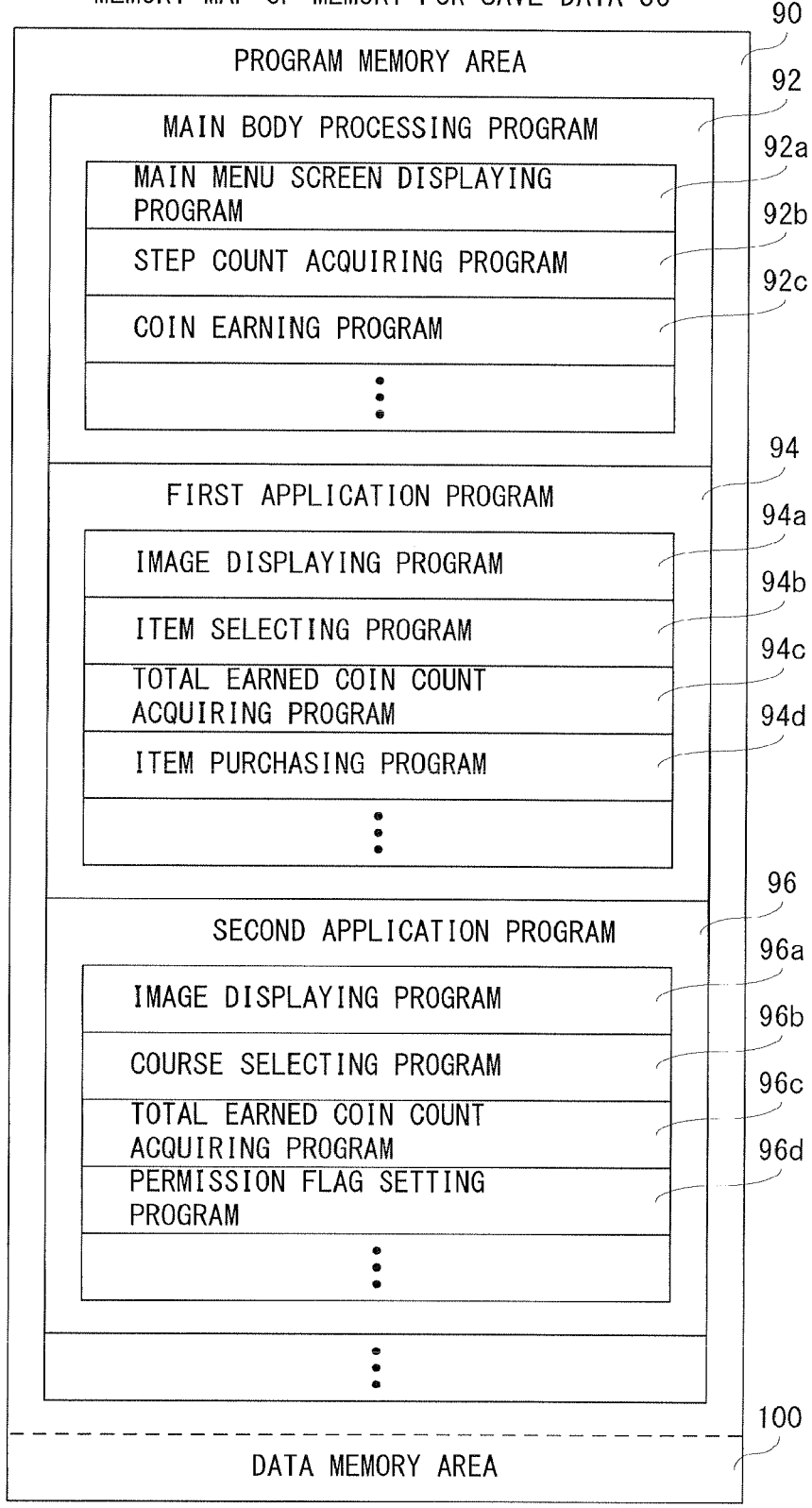
FIG. 5 is an illustrative view showing a memory map of a memory for saved data shown in FIG. 3.

FIG. 5 is an illustrative view showing a memory map of the memory for saved data 56 shown in FIG. 3. As shown in FIG. 5, the memory for saved data 56 includes a program memory area 90 and a data memory area 100. In the program memory area 90, a main body processing program 92, a first application program 94, a second application program 96, . . . are stored.

The main body processing program 92 is made up of a main menu screen displaying program 92*a*, a step count acquiring program 92*b*, a coin earning program 92*c*, etc.

The main menu screen displaying program 92*a* is a program for displaying the main menu screen 200 shown in FIG. 4(A) in a case that the main power supply of the game apparatus 10 is turned on or in a case that the processing of the application is ended.

The step count acquiring program 92*b* is a program for receiving data (step count data) as to step counts transmitted from the micon 68, and store the same in the data memory area 100.

The coin earning program 92*c* is a program for converting the step counts indicated by the step count data (1020, 1022; . . . , 102*m*) into the earned coins. In this embodiment, conversion is made to the earned coins as a value correlated to the step count (correlation value), but there is no need of being restricted thereto, and conversion to other items and parameters may be possible.

Although illustration is omitted, in the main body processing program 92, sound outputting program, etc. is also stored. The sound outputting program is a program for outputting a sound (sound effect), and music (BGM).

The first application program 94 is made up of an image displaying program 94*a*, an item selecting program 94*b*, a total earned coin count acquiring program 94*c*, an item purchasing program 94*d*, etc.

The image displaying program 94*a* is a program for displaying a game image (game screen) on the first LCD 16 and the second LCD 18. More specifically, the image displaying program 94*a* is executed to generate a game image by using image data not shown (polygon data, texture data, etc.), and to output the same on the first LCD 16 and the second LCD 18. This holds true hereunder.

The item selecting program 94*b* is a program for determining whether or not an item is selected according to an instruction from the user or the player. More specifically, it is determined whether or not any one of the button images 302-312 is turned on on the item selecting screen 300 shown in FIG. 4(B).

The total earned coin count acquiring program 94*c* is a program for acquiring a total number of earned coins (hereinafter referred to as "total coin count"). More specifically, total earned coin count data 1028 included in the earned coin count data 102*b* stored in a shared data memory area 102 described later is read.

The item purchasing program 94*d* is a program for purchasing the normal item (the first to fourth items) or the special item (special items A, B) by using the normal coin or the earned coin.

Although illustration is omitted, a sound outputting program, a backup program, etc. are also included in the first application program. The sound outputting program is a program for outputting a sound (sound effect) and music (BGM) associated with execution of the first application program. Furthermore, the backup program is a program for storing (saving) game data (proceeding data, end data) stored in the main memory 52 in the first application memory area 104 (see FIG. 6) of the memory for saved data 56 and the memory cards 26, 28 according to an instruction from the user or the player, or according to a predetermined event. This holds true for other application programs including the second application program.

In addition, the second application program 96 is made up of an image displaying program 96*a*, a course selecting program 96*b*, a total earned coin count acquiring program 96*c*, a permission flag setting program 96*d*, etc. The image displaying program 96a and the total earned coin count acquiring program 96c are the same as the above-described image displaying program 94a and total earned coin count acquiring program 94c, and a redundant explanation therefor is omitted.

The course selecting program 96b is a program for determining whether or not any one of the button images 402 to 412 is turned on on the course selecting screen 400 as shown in FIG. 4(C) at a start (restart) of the game.

The permission flag setting program 96d is a program for setting a flag (permission flag) as to whether or not game playing is performed at the special course (special courses A, B).

Although illustration is omitted, in the second application program 96, a sound outputting program, a backup program, etc. are included.

In addition, although illustration is omitted, in the program memory area 90, other application programs are also stored.

Figure 6:
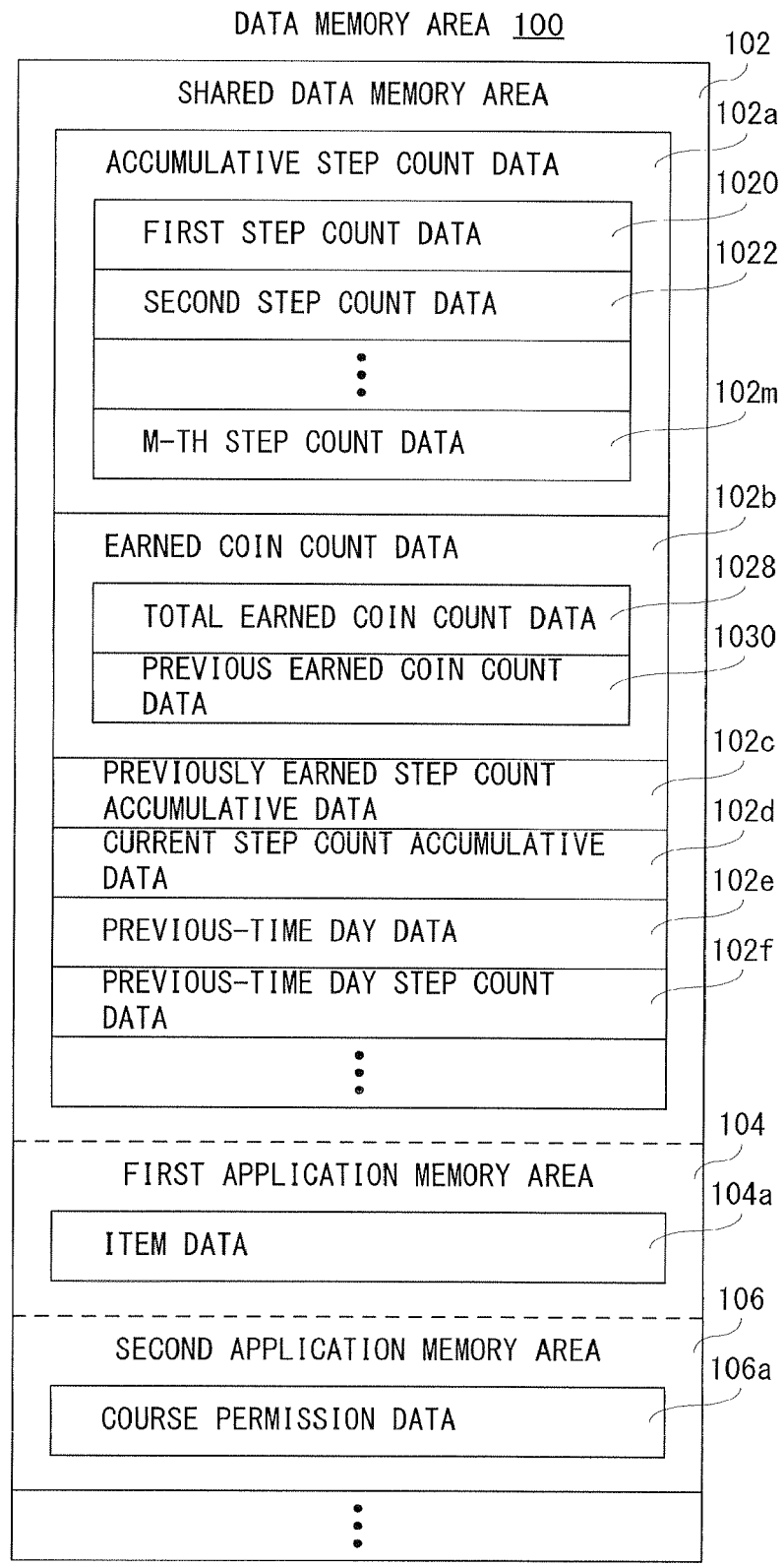
FIG. 6 is an illustrative view showing a detailed content of a data memory area shown in FIG. 5.

As shown in FIG. 6, the data memory area 100 of the memory for saved data 56 includes the shared data memory area 102, the first application memory area 104, a second application memory area 106, etc.

The shared data memory area 102 is an area accessible irrespective of the kind of active application program. That is, this is an area capable of writing to and reading from even if either application is executed. In the shared data memory area 102, accumulative step count data 102a, earned coin count data 102b, previous step count accumulative data 102c, current step count accumulative data 102d, previous-time day data 102e, previous-time day step count data 102f, etc. are stored. The accumulative step count data 102a includes first step count data 1020, second step count data 1022, . . . , the m-th step count data 102m. The step count data 1020-102m is data as to step counts acquired by the micon 68 every unit of time, and includes information about a time (date and time (hour, minute, second)) when the step counts are acquired. Here, the step count data (1020, 1022, . . . , 102m) is acquired from the micon 68, and stored in the data memory area 100 in a case that the main menu screen 200 is displayed on the second LCD 18 (or the first LCD 16) of the game apparatus 10.

The earned coin count data 102b includes total earned coin count data 1028 and previously earned coin count data 1030. The total earned coin count data 1028 is numerical value data as to a total coin count. The previously earned coin count data 1030 is numerical value data as to the number of earned coins when the step counts are previously converted into the earned coins.

The previous step count accumulative data 102c is numerical value data as to an accumulative amount of step counts until the step counts are previously converted into the earned coins. The current step count accumulative data 102d is numerical value data as to an accumulative amount of step counts until now. The previous-time day data 102e is data as to a date (year, month and day) when the step counts are previously converted into coins (change to coins). The previous-time day step count data 102f is numerical value data as to step counts before a change to coins is made out of the step counts at the date (year, month and day) when a change to coin is previously performed.

Furthermore, the first application memory area 104 is an area accessible only when the first application program 94 is executed. In the first application memory area 104, item data 104a is stored. Although illustration is omitted, the item data 104a is data indicating whether or not an item is acquired (possessed), and a flag is set by being brought into correspondence with each item. In a case that the player (user) or the player character has (possesses) an item, the flag corresponding to the item is turned on. On the other hand, in a case that the player (user) or the player character does not have (possesses) an item, the flag corresponding to the item is turned off.

Here, only the item data 104a is described for simplicity, but the game data including the item data 104a is actually stored.

In addition, the second application memory area 106 is an area accessible only when the second application program 96 is executed. In the second application memory area 106, course permission data 106a is stored. Although illustration is omitted, the course permission data 106a is data of a permission flag as to whether or not playing on the special courses A, B is permitted. If playing on the special courses A, B is permitted, the flag corresponding to each of the special courses A, B is turned on. On the other hand, if playing on the special courses A, B is not permitted, the flag corresponding to each of the special courses A, B is turned off.

Here, only the course permission data 106a is described for simplicity, but the game data including the course permission data 106a is actually stored.

Additionally, in the data memory area 100, a memory area for another application is provided.

In addition, although detailed description is omitted, the main body processing program 92 and the application program (94, 96, . . . ) to be executed by the CPU 50 are read (loaded) into the main memory 52. Moreover, data generated or created during execution of the main body processing program 92 and the application program (94, 96, . . . ) is stored in the main memory 52, or stored (saved) in the memory for saved data 56 as necessary.

Figure 7:
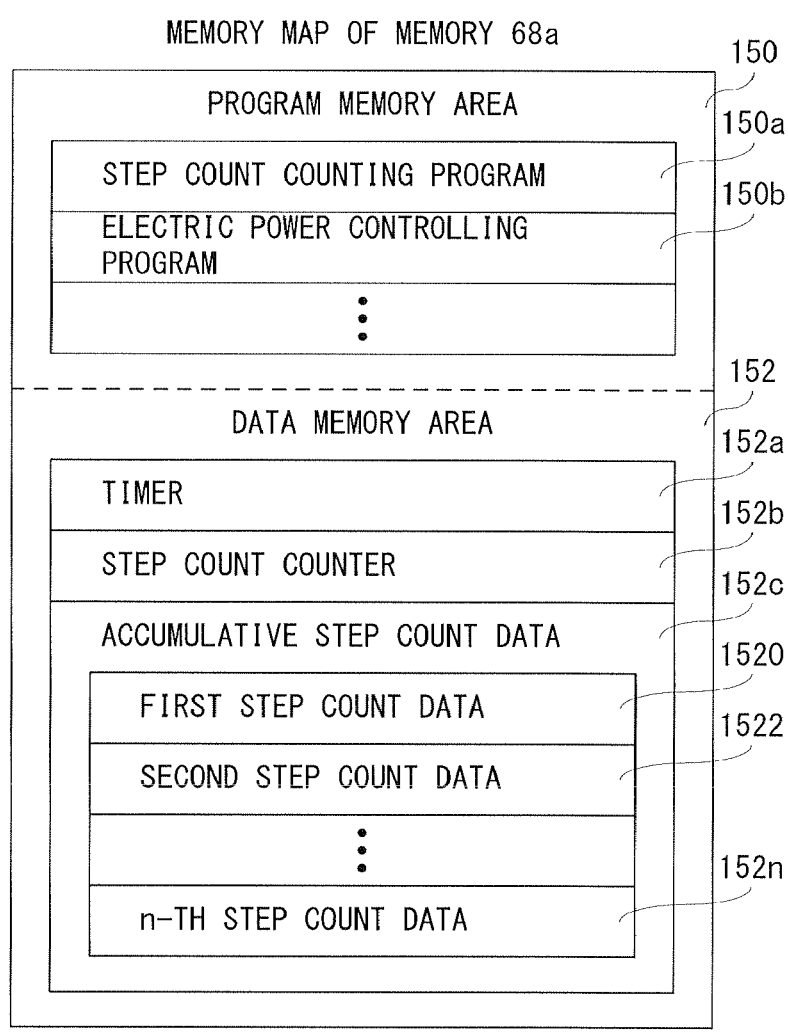
FIG. 7 is an illustrative view showing a memory map of a memory integrated in a micon shown in FIG. 3.

FIG. 7 is a memory map of the memory 68a provided to the micon 68. The memory 68a includes a program memory area 150 and a data memory area 152. In the program memory area 150, programs, such as a step count counting program 150a, an electric power controlling program 150b, etc. are stored.

The step count counting program 150a is a program for counting step counts. In this embodiment, the step count counting program 150a is a program for counting step counts on the basis of a change amount of accelerations (three-axis accelerations) indicated by the acceleration data from the acceleration sensor 88. The electric power controlling program 150b is a program for instructing the CPU 50 to switch between the normal mode (non-sleep state) and the sleep mode (sleep state) in response to an on and an off signal from the opening and closing switch 42, and controlling electric power supply from the power supply circuit 70 to each of the circuit components according to an instruction from the CPU 50. This makes it possible to switch between the used state and the unused state of the game apparatus 10.

Although illustration is omitted, in the program memory area 150b, other programs are also stored.

In the data memory area 152, a timer 152a and a step count counter 152b are provided. The timer 152a is a timer for counting a time from the start of counting step counts. The step count counter 152b is an up counter for counting step counts.

Furthermore, in the data memory area 152, accumulative step count data 152c is stored. In the accumulative step count data 152c, first step count data 1520, second step count data 1522, . . . , n-th step count data 152n are stored. Here, each step count data (1520, 1522, . . . , 152n) is data as to step counts per first unit of time (one hour in this embodiment). For example, the first step count data 1520, the second step count data 1522, . . . , the n-th step count data 152*n* are stored in this order. Additionally, the memory 68*a* has relatively low capacity, and therefore, in the sleep mode, the accumulative step count data 152*c* stored in the data memory area 152 per second unit of time (three hours in this embodiment) is output to the CPU 50, and moved (saved) to the memory for saved data 56 via the memory controlling circuit 54. As explained in detail, the micon 68 operates a clock of the CPU 50, controls the power supply circuit 70 to start supplying electric power to the memory controlling circuit 54 and the memory for saved data 56 according to an instruction from the CPU 50, and then outputs the accumulative step count data 152*c* to the CPU 50. Then, the CPU 50 stores the accumulative step count data 152*c* in the memory for saved data 56 via the memory controlling circuit 54. Thereafter, the micon 68 stops the clock of the CPU 50, and controls the power supply circuit 70 to stop supplying the electric power to the memory controlling circuit 54 and the memory for saved data 56.

Figure 8:
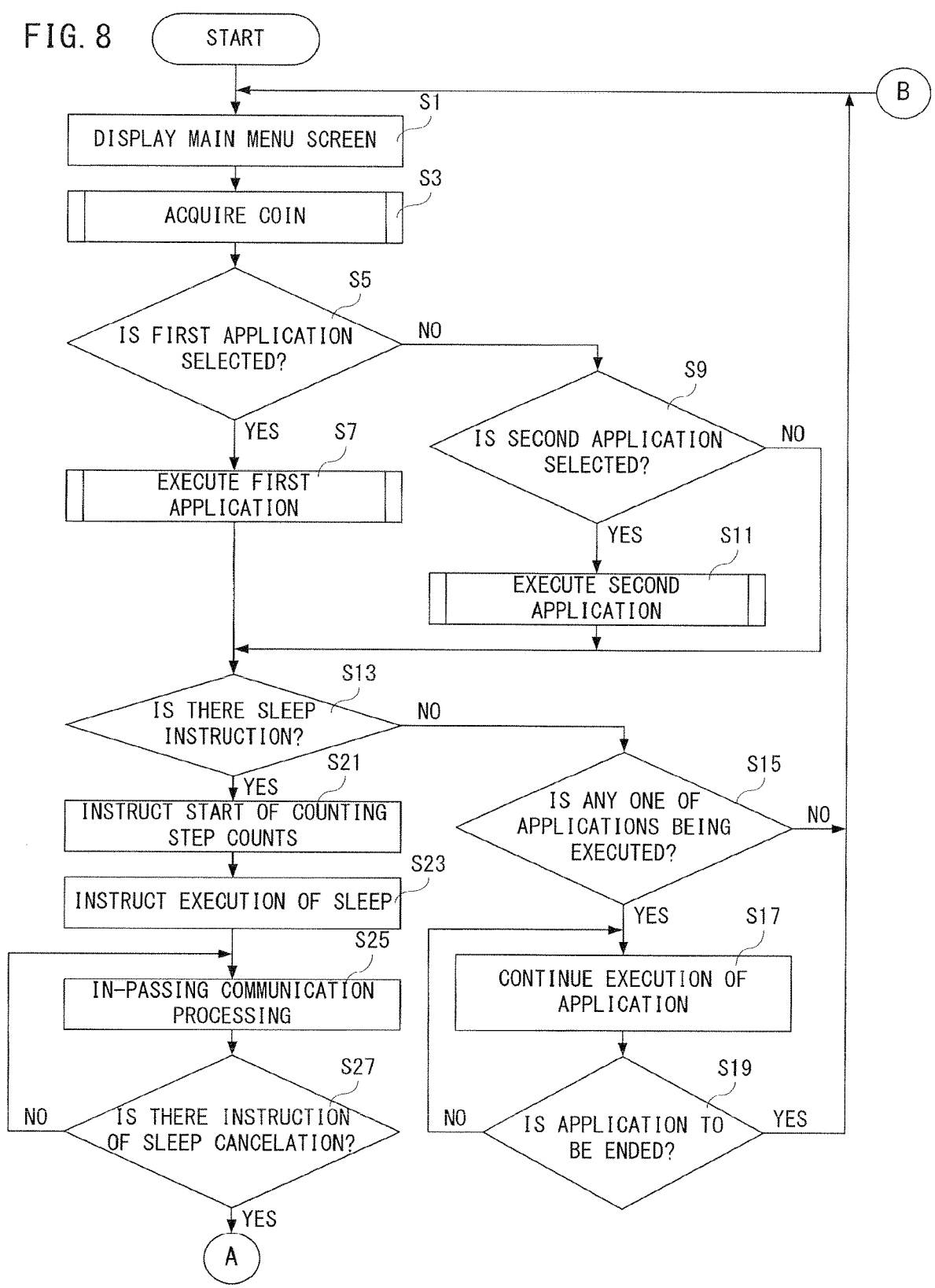
FIG. 8 is a flowchart showing a part of entire processing by a CPU shown in FIG. 3.
Figure 9:
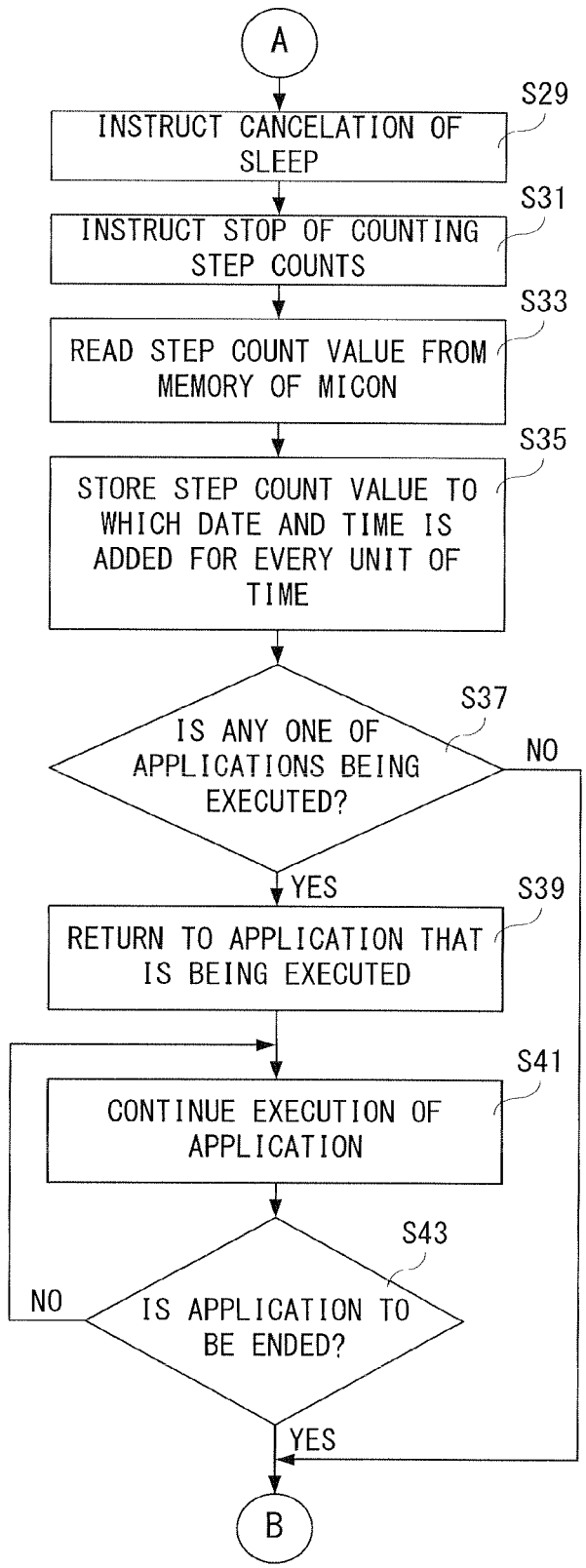
FIG. 9 is a flowchart showing another part of the entire processing by the CPU shown in FIG. 3, and sequel to FIG. 8.

Each of FIG. 8 and FIG. 9 is entire processing by the CPU 50 shown in FIG. 3. When the main power supply of the game apparatus 10 is turned on, the CPU 50 starts entire processing to display the main menu screen 200 as shown in FIG. 4(A) in a step S1 as shown in FIG. 8. In a succeeding step S3, coin earning processing (see FIG. 10-FIG. 12) described later is executed. Then, in a step S5, it is determined whether or not the first application is selected. That is, it is determined whether or not the button image 202 representing the first application is turned on on the main menu screen 200.

If "YES" in the step S5, that is, if the first application is selected, first application executing processing (see FIG. 15) described later is executed in a step S7, and then, the process proceeds to the step S13. On the other hand, if "NO" in the step S5, that is, if the first application is not selected, it is determined whether or not the second application is selected in a step S9. That is, it is determined whether or not the button image 204 representing the second application is turned on the main menu screen 200.

If "YES" in the step S9, that is, if the second application is selected, second application executing processing (see FIG. 16) described later is executed in a step S11, and then, the process proceeds to a step S13. On the other hand, if "NO" in the step S9, that is, if execution of the second application is not selected, the process proceeds to the step S13 as it is.

Additionally, in this embodiment, in a case that "NO" in the step S9, the process directly proceeds to the step S13. However, in a case that another application is selectable, it is determined whether or not execution of the other application is selected.

Furthermore, in this embodiment, a case that one application is selectable from two applications is shown, but only one application may be made selectable.

That is, depending on the number of application programs that is stored in the memory cards 26, 28 and the memory for saved data 58 and the number of downloaded application programs, the number of selectable applications is variably set.

Returning to FIG. 8, it is determined whether or not there is an instruction of the sleep in the step S13. That is, the CPU 50 determines whether or not there is an instruction of the sleep from the micon 68. Here, in a case that the opening and closing switch 42 is turned off, the micon 68 instructs the CPU 50 of the sleep.

If "NO" in the step S13, that is, if there is no instruction of the sleep, it is determined whether or not any one of the applications is being executed in a step S15. If "NO" in the step S15, that is, if no application is being executed, the process returns to the step S1 as it is.

On the other hand, if "YES" in the step S15, that is, if any one of the applications is being executed, the application that is being executed is continued in a step S17. Successively, in a step S19, it is determined whether or not the application is to be ended. In the step S19, the CPU 50 determines whether or not there is an instruction of an application end from the user or the player.

If "NO" in the step S19, that is, if the application is not be ended, the process returns to the step S17 as it is. On the other hand, if "YES" in the step S19, that is, if the application is to be ended, the execution of the application is ended although illustration is omitted, and the process returns to the step S1.

Alternatively, if "YES" in the step S13, that is, if there is an instruction of the sleep, the micon 68 is instructed to start counting step counts in a step S21. In a next step S23, the micon 68 is instructed to execute the sleep. Accordingly, the micon 68 stops the clock of the CPU 50, and controls the power supply circuit 70 to stop supplying electric power to the circuit components except for the wireless communication module 64. Here, the CPU 50 stores the game data of the main memory 52 in the memory area for application (104, 106, . . . ), and then, stops the application if the application is being executed.

It should be noted that the CPU 50 and the micon 68 are always supplied with the electric power as described above.

Successively, in a step S25, in-passing communication processing is executed. Here, during the sleep, the clock of the CPU 50 has been stopped, and therefore, when the wireless communication module 64 receives a connection request signal and a connection admission signal from other game apparatuses 10 and access points, the wireless communication module 64 activates the CPU 50 to make it execute the in-passing communication processing. At this time, according to an instruction from the CPU 50, the micon 68 controls the power supply circuit 70 to start supplying electric power to the memory controlling circuit 54 and the memory for saved data 56.

In a next step S27, it is determined whether or not there is an instruction of a sleep cancelation. That is, the CPU 50 determines whether or not a clock is operated by the micon 68. If "NO" in the step S27, that is, if there is no instruction of a sleep cancelation, the process returns to the step S25.

Here, the description is made such that the processing in the steps S25 and S27 are executed by the CPU 50, but, the CPU 50 actually executes no processing during the sleep. In a case that the CPU 50 is activated by the wireless communication module 64 and the micon 68, an in-passing communication and a normal processing (game processing, etc.) are executed.

Alternatively, if "YES" in the step S27, that is, if there is an instruction of a sleep cancelation, the micon 68 is instructed to cancel the sleep in a step S29 shown in FIG. 9. In a succeeding step S31, the micon 68 is instructed to stop counting the step counts. Then, in a step S33, a step count value is read from the memory 68*a* of the micon 68, and in a step S35, each of the step count values to which a date and time is added for every unit of time is stored.

That is, the CPU 50 reads the accumulative step count data 152*c* (the first to the n-th step count data 1520-152*n*) from the memory 68*a* of the micon 68 in the step S33, and writes the same in the data memory area 100 of the memory for saved data 56 in the step S35. At this time, the CPU 50 writes (overwrites) a copy of the current step count accumulative data 102*d* to the previous step count accumulative data 102*c*, and then stores (overwrites) the numerical value data of the total value of step counts acquired by adding the total value of step counts currently read to the current accumulative amount of step counts (the previous accumulative amount of step counts) indicated by the current step count accumulative data 102*d* (or previous step count accumulative data 102*c*) as current step count accumulative data 102*d*. Here, the current step count accumulative data 102*d* may be the numerical value data of the total value of step counts indicated by the accumulative step count data 102*a*, that is, the total value of step counts indicated by the first step count data 1020, the second step count data 1022, . . . , the m-th step count data 102*m*.

Returning to FIG. 9, in a step S37, it is determined whether or not any one of the applications is being executed. Here, the CPU 50 determines whether or not the execution of the application has been stopped due to the sleep during execution of the application. If "NO" in the step S37, that is, if any one of the applications is not being executed, the process returns to the step S1 shown in FIG. 8.

On the other hand, if "YES" in the step S37, that is, if any one of the applications is being executed, the process is restarted (returns) to the application that is being executed in a step S39. At this time, the CPU 50 reads the game data stored in the memory area for application (104, 106, . . . ) before execution of the sleep, and writes (loads) the same in the main memory 52. Successively, in a step S41, the execution of the application is continued, and in a step S43, it is determined whether or not the application is to be ended.

If "NO" in the step S43, that is, if the application is not to be ended, the process returns to the step S41 as it is. On the other hand, if "YES" in the step S43, that is, if the application is to be ended, the execution of the application is ended although illustration is omitted, and the process returns to the step S1.

Figure 10:
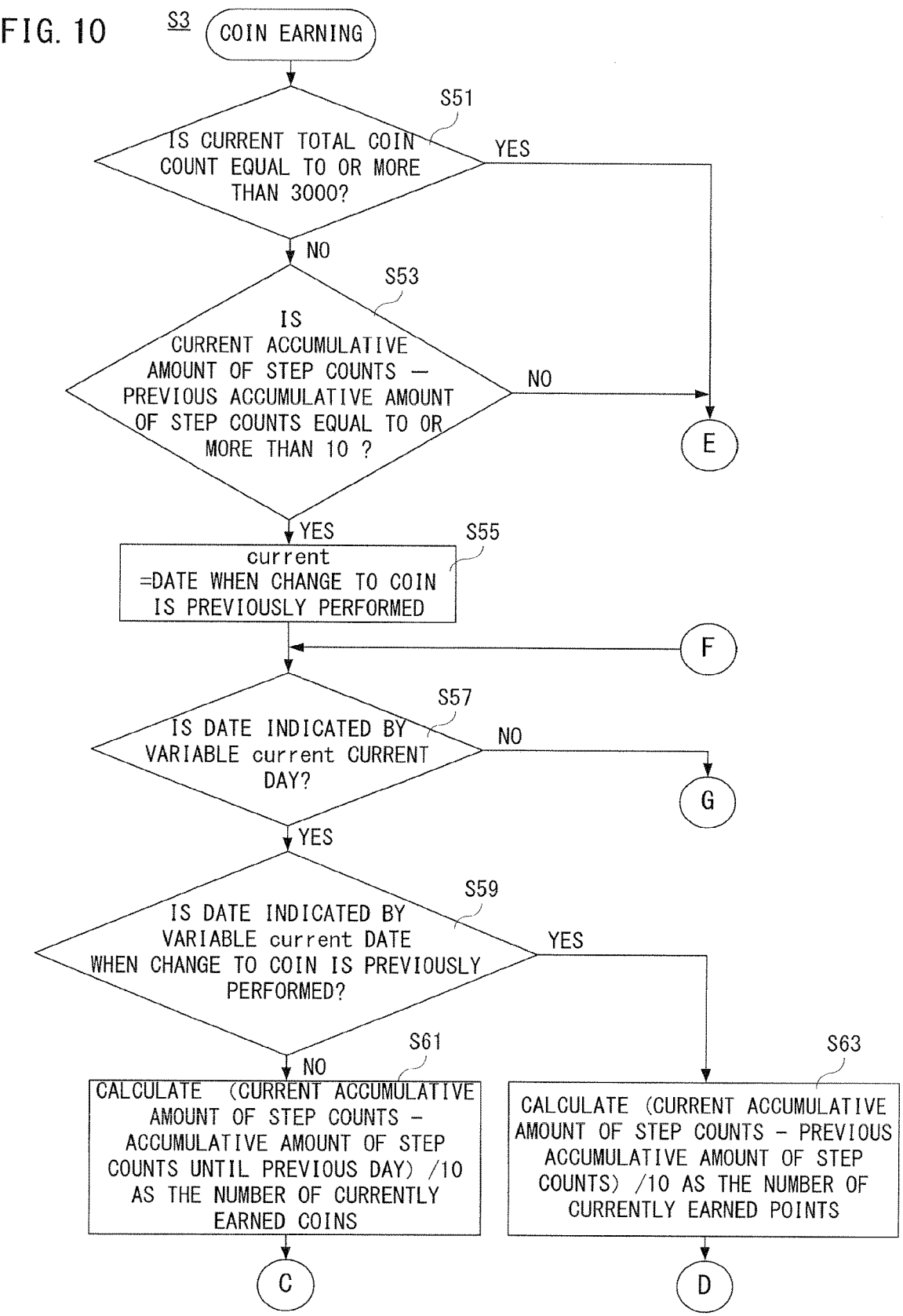
FIG. 10 is a flowchart showing a part of coin earning processing by the CPU shown in FIG. 3.

FIG. 10 is a flowchart showing the coin earning processing in the step S3 in FIG. 8. As shown in FIG. 10, when starting the coin earning processing, the CPU 50 determines whether or not the current total coin count is equal to or more than 3000 in a step S51. Here, as described above, the total coin count is a total number of earned coins indicated by the total earned coin count data 1028. That is, the CPU 50 determines whether or not the total coin count is equal to or more than 3000 (upper limit or not) with reference to the total earned coin count data 1028 stored in the data memory area 100 of the memory for saved data 56.

If "YES" in the step S51, that is, if the current total coin count is equal to or more than 3000, it is determined that the total coin count reaches the upper limit, and the process returns to the entire processing as it is. On the other hand, if "NO" in the step S51, that is, if the current total coin count is less than 3000, it is determined whether or not the current accumulative amount of step counts−the previous accumulative amount of step counts is equal to or more than 10 in a step S53. Here, the CPU 50 determines whether or not the user or the player walks by the minimum step counts required for conversion to a current earned coin. That is, in this embodiment, ten steps are converted into one earned coin. Here, the CPU 50 performs the determination processing in the step S53 by subtracting the previous accumulative amount of step counts indicated by the previous step count accumulative data 102*c* stored in the data memory area 100 of the memory for saved data 58 from the current accumulative amount of step counts indicated by the current step count accumulative data 102*d* stored in the data memory area 100 of the memory for saved data 58. Here, a ratio of converting the step counts into an earned coin is mere one example, and there is no need of being restricted thereto.

If "NO" in the step S53, that is, if the current accumulative amount of step counts−the previous accumulative amount of step counts is less than 10, the process returns to the entire processing. On the other hand, if "YES" in the step S53, that is, if the current accumulative amount of step counts−the previous accumulative amount of step counts is equal to or more than 10, a date when a change to coin is previously performed is substituted into a variable current in a step S55. Here, the date when a change to coin is previously performed means the date when the step counts are previously converted into the earned coins.

In a succeeding step S57, it is determined whether or not the date indicated by the variable current is a current day (today). If "YES" in the step S57, that is, if the date indicated by the variable current is a current day, it is determined whether or not the date indicated by the variable current is the date when a change to coin is previously performed in a step S59. Here, the CPU 50 determines whether or not the date indicated by the previous-time day data 102*e* is coincident with the date indicated by the variable current.

Figure 11:
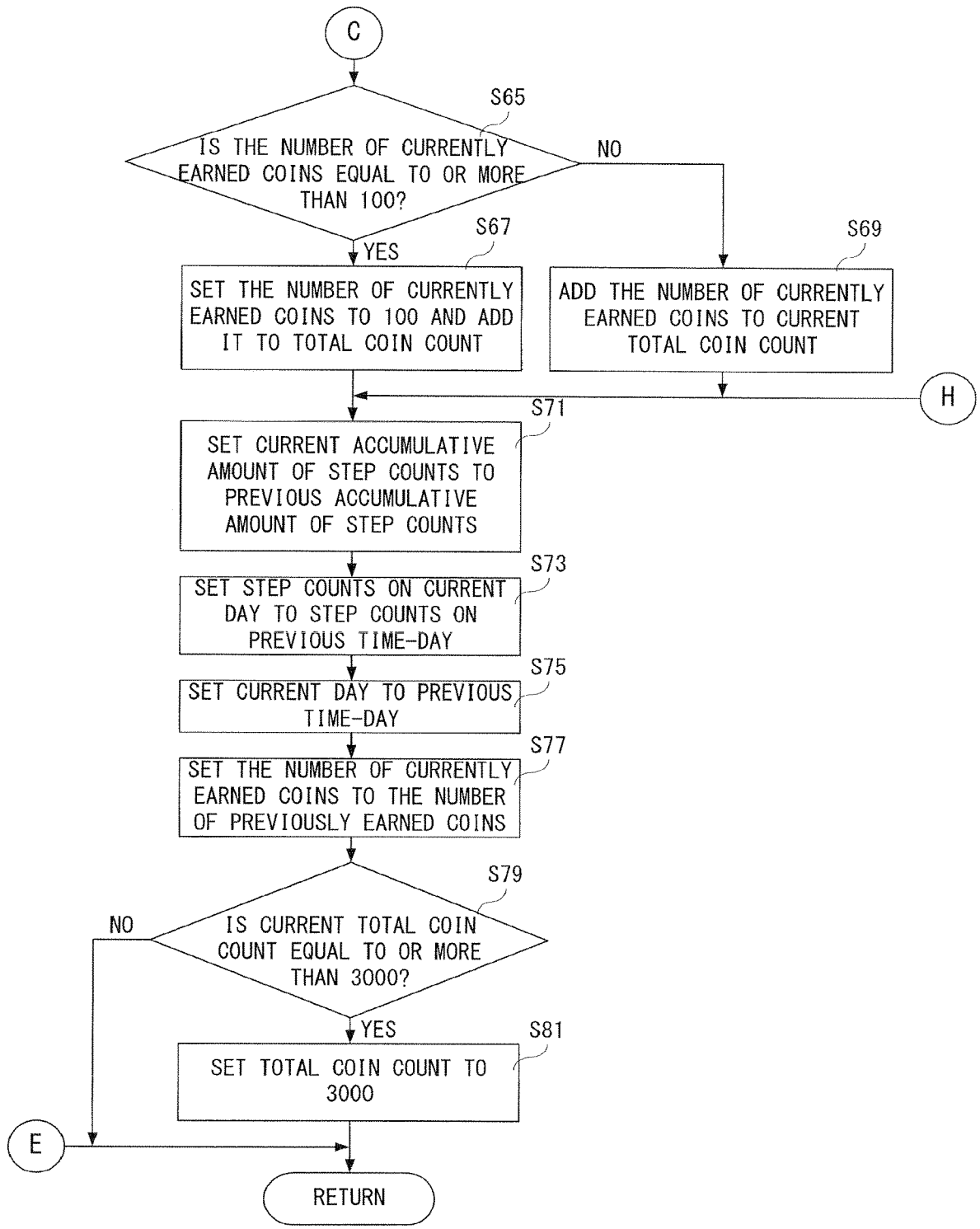
FIG. 11 is a flowchart showing a second part of the coin earning processing by the CPU shown in FIG. 3, and sequel to FIG. 10.

If "NO" in the step S59, that is, if the date indicated by the variable current is not coincident with the date when a change to coin is previously performed, the date when a change to coin is previously performed is not identical with the current day, and therefore, in a step S61, (the current accumulative amount of step counts−the accumulative amount of step counts until the previous day)/10 is evaluated as the number of currently earned coins, and the process proceeds to a step S65 shown in FIG. 11. Here, if the value is evaluated with a remainder, the earned coin is added by one. Or, if the value is evaluated with a remainder, the step count may be rounded down. This holds true hereunder. On the other hand, if "YES" in the step S59, that is, if the date indicated by the variable current is the date when a change to coin is previously performed, a change to coins is previously performed on the date the same as the current day, and therefore, in a step 63, (the current accumulative amount of step counts−the previous accumulative amount of step counts)/10 is calculated as the number of currently earned coins, and the process proceeds to a step S83 shown in FIG. 12.

In the step S65 shown in FIG. 11, it is determined whether or not the number of currently earned coins is equal to or more than 100. If "YES" in the step S65, the number of currently earned coins is set (corrected) to 100, the total coin count is added in a step S67, and the process proceeds to a step S71. Thus, by executing the processing in the step S67, the maximum number of earned coins that can be converted a day is restricted. If an unlimited number of earned coins that can be converted a day is allowed, a large difference occurs in the game processing between the users or the players who are different in amounts of walking. This is also because by restricting the number of earned coins that can be converted a day, it is possible to urge the user or the player to make moderate walking continuously. This holds true for a case that the number of earned coins is restricted hereunder. However, the unlimited number of earned coins that can be converted a day may be allowed. On the other hand, if "NO" in the step S65, that is, if the number of currently earned coins is less than 100, the number of currently earned coins is added to the current total coin count in a step S69, and the process proceeds to the step S71.

Figure 12:
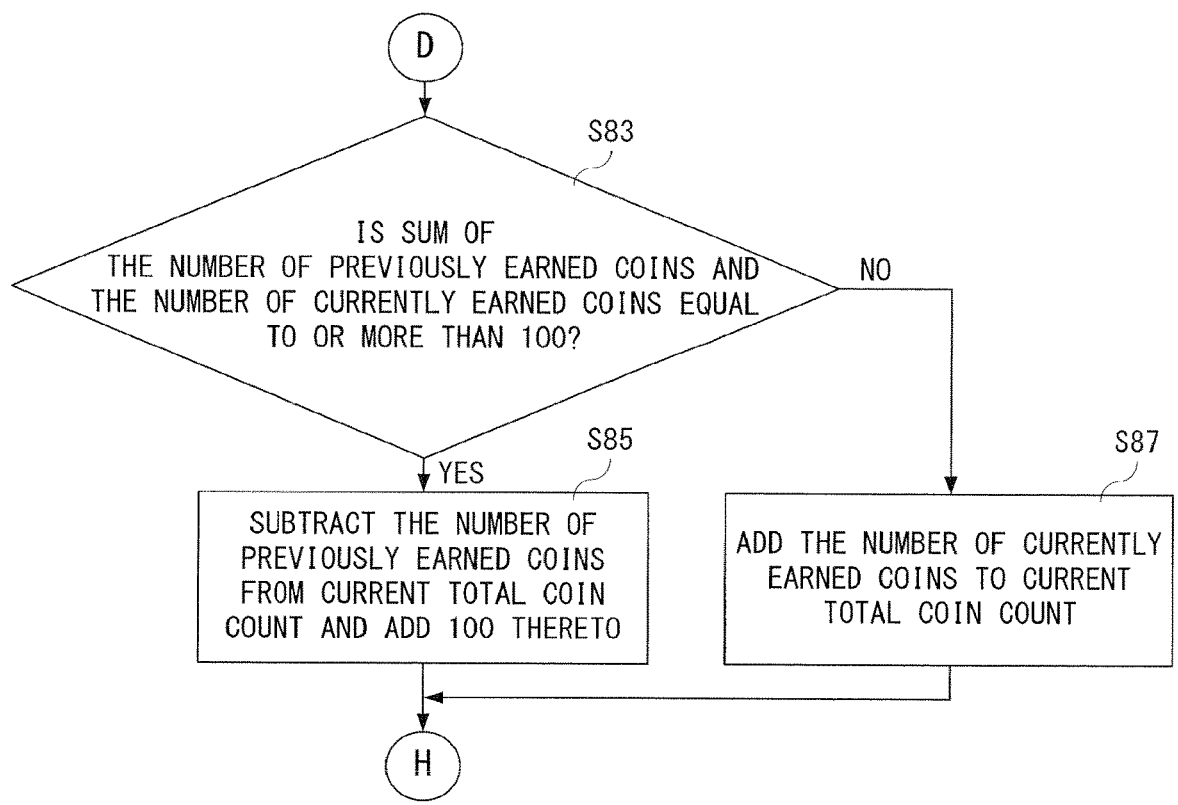
FIG. 12 is a flowchart showing a third part of the coin earning processing by the CPU shown in FIG. 3, and sequel to FIG. 10.

Additionally, as shown in FIG. 12, in the step S83, it is determined whether or not the sum of the number of previously earned coins and the number of currently earned coins is equal to or more than 100. Here, the number of previously earned coins is the number of earned coins indicated by the previously earned coin count data 1030. If "YES" in the step S83, that is, if the sum of the number of previously earned coins and the number of currently earned coins is equal to or more than 100, 100 is added after the number of previously earned coins is subtracted from the current total coin count in a step S85, and the process proceeds to the step S71 shown in FIG. 11. That is, the maximum number of earned coins that can be earned a day is restricted. On the other hand, if "NO" in the step S83, that is, if the sum of the number of previously earned coins and the number of currently earned coins is less than 100, the number of currently earned coins is added to the current total coin count in a step S87, and then, the process proceeds to the step S71.

Returning to FIG. 11, in the step S71, the current accumulative amount of step counts is set to the previous accumulative amount of step counts, and in a step S73, the step counts on the current day is set to the step counts on the previous-time day. In addition, in a step S75, the current day is set to the previous-time day, and in a step S77, the number of currently earned coins is set to the number of previously earned coins. Here, the step counts on the current day is a total value of step counts indicated by the m-th step count data 102m dated today out of the accumulative step count data 102a. The current day is a today's date to be calculated on the basis of the time counted by the RTC 68b.

Here, in this embodiment, in the step S77, the number of currently earned coins is set to the number of previously earned coins for simplicity, but strictly, the processing is different between a case that "YES" is determined in the step S59 and a case that "NO" is determined in the step S59. More specifically, in a case that "NO" is determined in the step S59, the processing in the step S77 is as it is, but in a case that "YES" is determined in the step S59, the sum of the number of previously earned coins and the number of currently earned coins is set to the number of previously earned coins in the step S77.

This is because that if the step counts are converted into earned coins three times or more a day, whether or not the sum of the earned coins at latest two times is above 100 is determined in the step S83 described later, resulting in inconvenience.

Then, in a step S79, it is determined whether or not the current total coin count is equal to or more than 3000. If "NO" in the step S79, the entire processing is returned as it is. On the other hand, if "YES" in the step S79, the total coin count is set to 3000 in a step S81, and the process returns to the entire processing. That is, by executing the processing in the step S81, a restriction is imposed on the total coin count. The reason why the restriction is imposed on the total coin count is to prevent a large difference in the content of the game from occurring between the users or the players who frequently carry the game apparatus 10 and the users or the players who do not frequently carry the game apparatus 10. That is, this is because of reducing unfairness between the users or the players.

Figure 13:
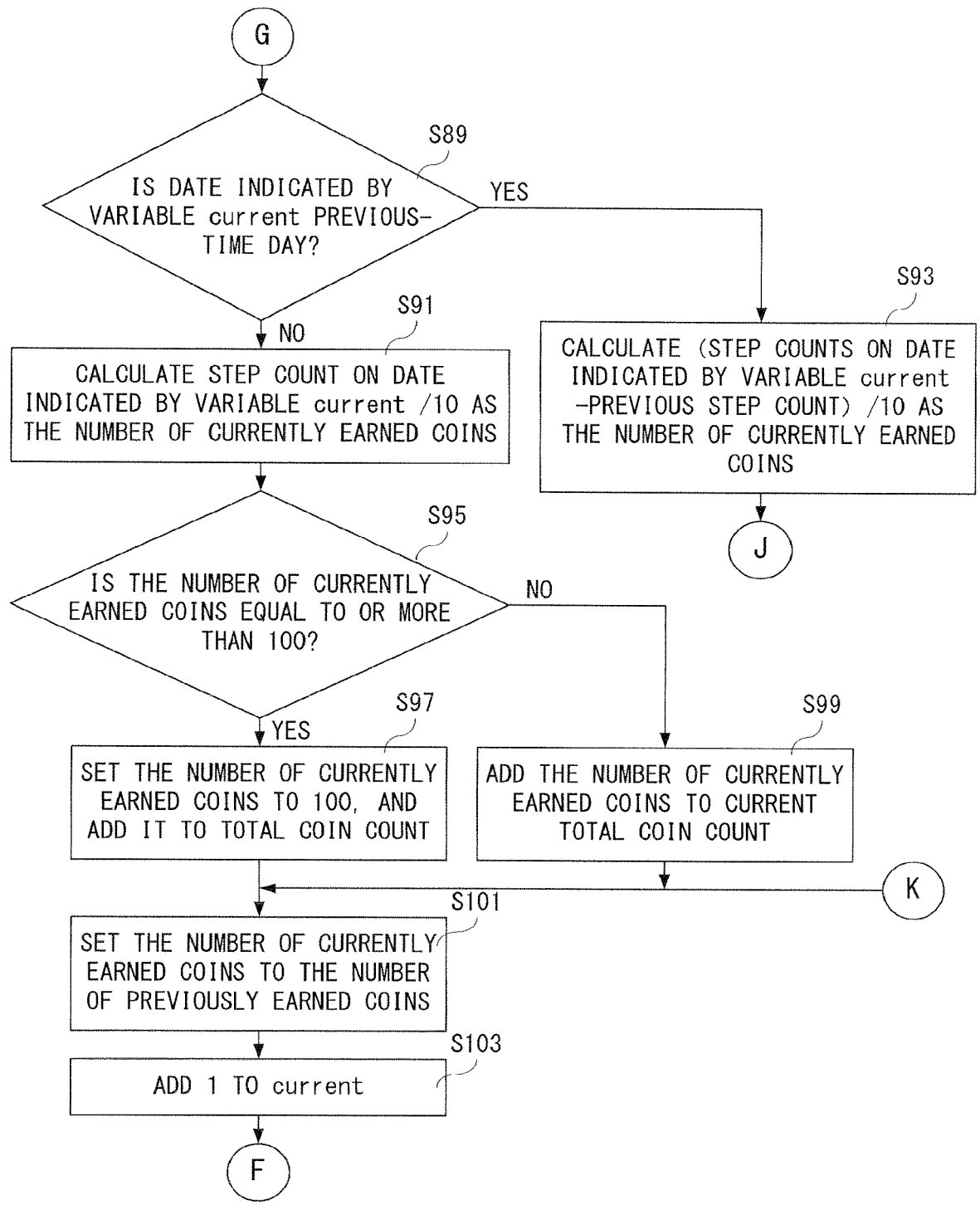
FIG. 13 is a flowchart showing a fourth part of the coin earning processing by the CPU shown in FIG. 3, and sequel to FIG. 10.

Additionally, as shown in FIG. 10, if "NO" in the step S57, it is determined whether or not the date indicated by the variable current is the previous-time day in a step S89 shown in FIG. 13. If "NO" in the step S89, that is, if the date indicated by the variable current is not the previous-time day, all the step counts on the date indicated by the variable current has not yet been converted into the coins, the step counts on the date indicated by the variable current/10 is calculated as the number of currently earned coins in a step S91, and the process proceeds to a step S95. On the other hand, if "YES" in the step S89, that is, if the date indicated by the variable current is the previous-time day, and therefore, out of all the step counts on the date indicated by the variable current, a part (step counts on the previous-time day) is converted into coins, and the rest is not converted into coins, and therefore, in a step S93, (the step counts on the date indicated by the variable current−the step counts on the previous-time day)/10 is calculated as the number of currently earned coins, and the process proceeds to a step S105 shown in FIG. 14.

In the step S95, it is determined whether or not the number of currently earned coins is equal to or more than 100. If "YES" in the step S95, the number of currently earned coins is set to 100, this is added to the total coin count in a step S97, and the process proceeds to a step S101. On the other hand, if "NO" in the step S95, the number of currently earned coins is added to the current total coin count in a step S99, and the process proceeds to the step S101.

Figure 14:
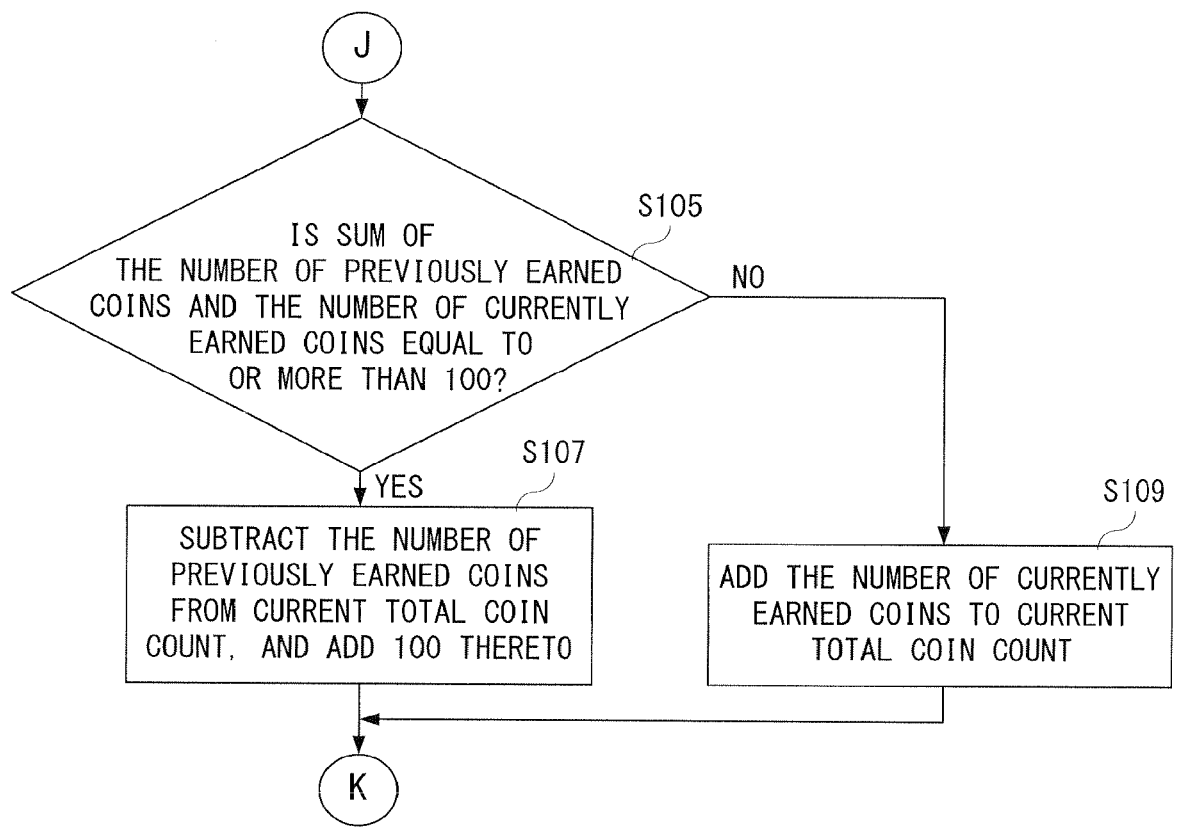
FIG. 14 is a flowchart showing a fifth part of the coin earning processing by the CPU shown in FIG. 3, and sequel to FIG. 13.

Additionally, as shown in FIG. 14, in the step S105, it is determined whether or not the sum of the number of previously earned coins and the number of currently earned coins is equal to or more than 100. If "YES" in the step S105, the number of previously earned coins is subtracted from the current total coin count, and 100 is added thereto in a step S107, and the process proceeds to the step S101 shown in FIG. 13. On the other hand, if "NO" in the step S105, the number of currently earned coins is added to the current total coin count in a step S109, and the process proceeds to the step S5101.

In the step S101, the number of currently earned coins is set to the number of previously earned coins. Then, in a step S103, 1 is added to the variable current, and the process returns to the step S57 shown in FIG. 10.

That is, by repeating the processing in the steps S57, S89 to 109, the step counts from the date when a change to coin is previously performed to the date previous to the current day (today) are converted into the earned coins every day.

Figure 15:
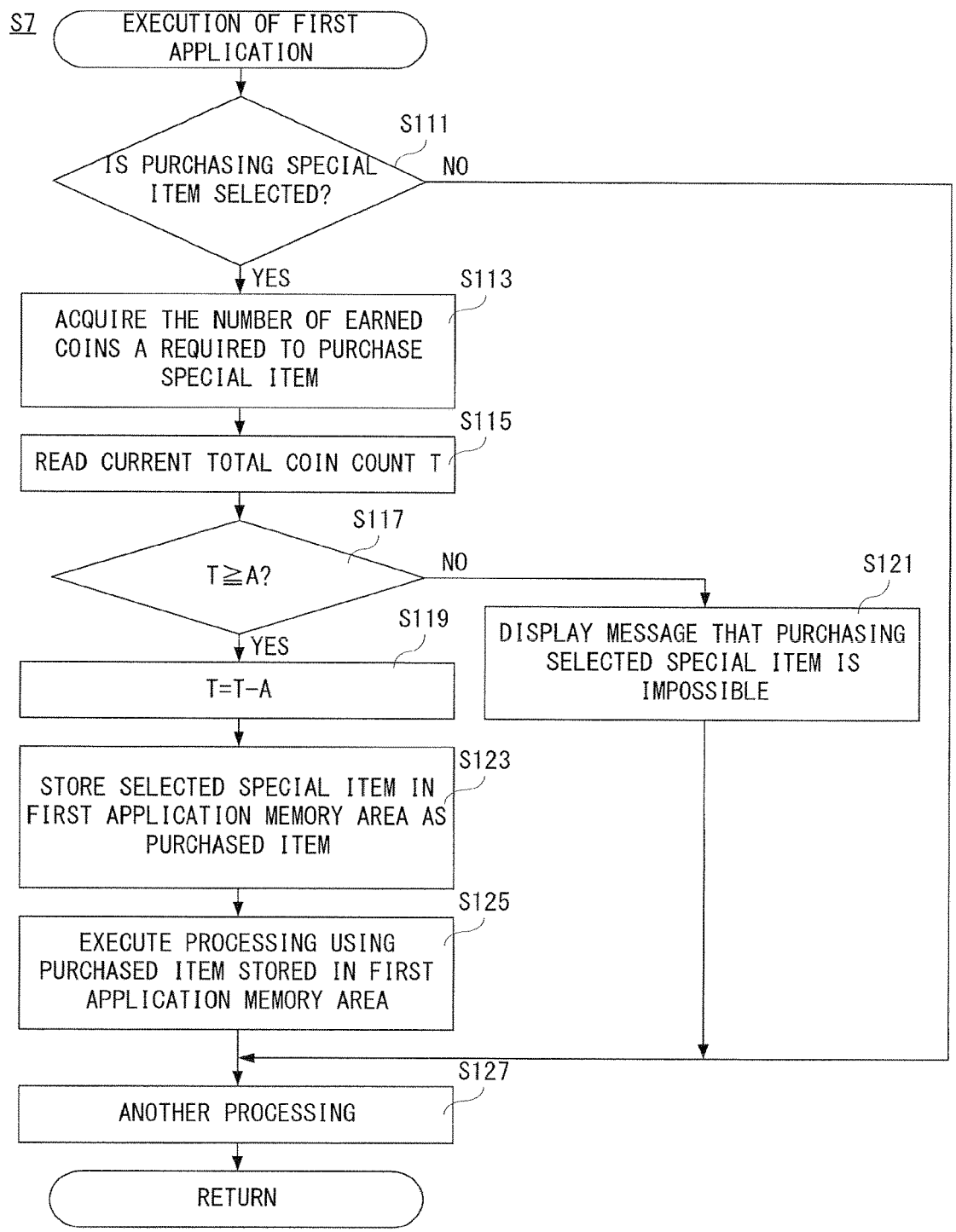
FIG. 15 is a flowchart showing first application executing processing by the CPU shown in FIG. 3.

FIG. 15 is a flowchart showing the first application executing processing in the step S7 in FIG. 8. As shown in FIG. 15, when starting the first application executing processing, the CPU 50 determines whether or not purchasing the special item is selected in a step S111. Here, the CPU 50 determines whether or not any one of the button images 310, 312 is turned on on the item purchasing screen 300 shown in FIG. 4(B) by the user or the player.

If "NO" in the step S111, that is, if the purchasing the special item is not selected, the process proceeds to a step S127 as it is. On the other hand, if "YES" in the step S111, that is, if purchasing the special item is selected, the number of earned coins A required to purchase the special item (special items A, B in this embodiment) is acquired in a step S113. Here, the number of earned coins A that is required to purchase the special items (A, B) is decided in advance.

In a succeeding step S115, the current total coin count T indicated by the total earned coin count data 1028 is read. In a next step S117, it is determined whether or not the total coin count T is equal to or more than the number of earned coins A. If "NO" in the step S117, that is, if the total coin count T is less than the required number of earned coins A, a message that purchasing the selected special item is impossible is displayed in a step S121, and the process proceeds to the step S127.

On the other hand, if "YES" in the step S117, that is, if the total coin count T is equal to or more than the required number of earned coins A, T−A is set to the total coin count T in a step S119, and the selected special item is stored in the first application memory area 104 as a purchased item (possessed item) in a step S123. That is, the flag as to the selected special item is turned on to thereby update the item data 104a. In a next step S125, processing by using the purchased item stored in the first application memory area 104 is executed, and the process proceeds to the step S127.

Here, in this embodiment, in a case that the special item is purchased, processing by using the special item (purchased item) is immediately executed. However, this is a mere one example, and the processing by using the purchased item may be executed when there is an instruction from the user or the player.

Furthermore, the processing by using the purchased item corresponds to the processing of, if the purchased item is a tool, performing a motion with the use of the tool by the player character. Alternatively, this corresponds to the processing of making the player character undefeatable for a fixed period of time by using the purchased item, for example. These are mere examples, and there is no need of being restricted thereto.

Returning to FIG. 15, in the step S127, another processing is executed to return to the entire processing. Here, according to an instruction from the player, the player character is caused to perform an arbitrary action, move the player character, etc. Furthermore, according to a control by the computer (CPU 50), the non-player character moving and so forth independent of an operation by the player is caused to perform an arbitrary action, and the non-player character is caused to move, and etc. In addition, processing according to a game event is executed, processing of outputting a sound (music) is executed, or processing of displaying (updating) the game screen is executed.

It should be noted that in this embodiment, an explanation is made only the case that the special items A, B are purchased, but this holds true for a case that the normal item (the first to fourth items) is purchased. Here, the normal item can be purchased not by the earned coins acquired by converting the step counts but by the coins acquired in the game.

Figure 16:
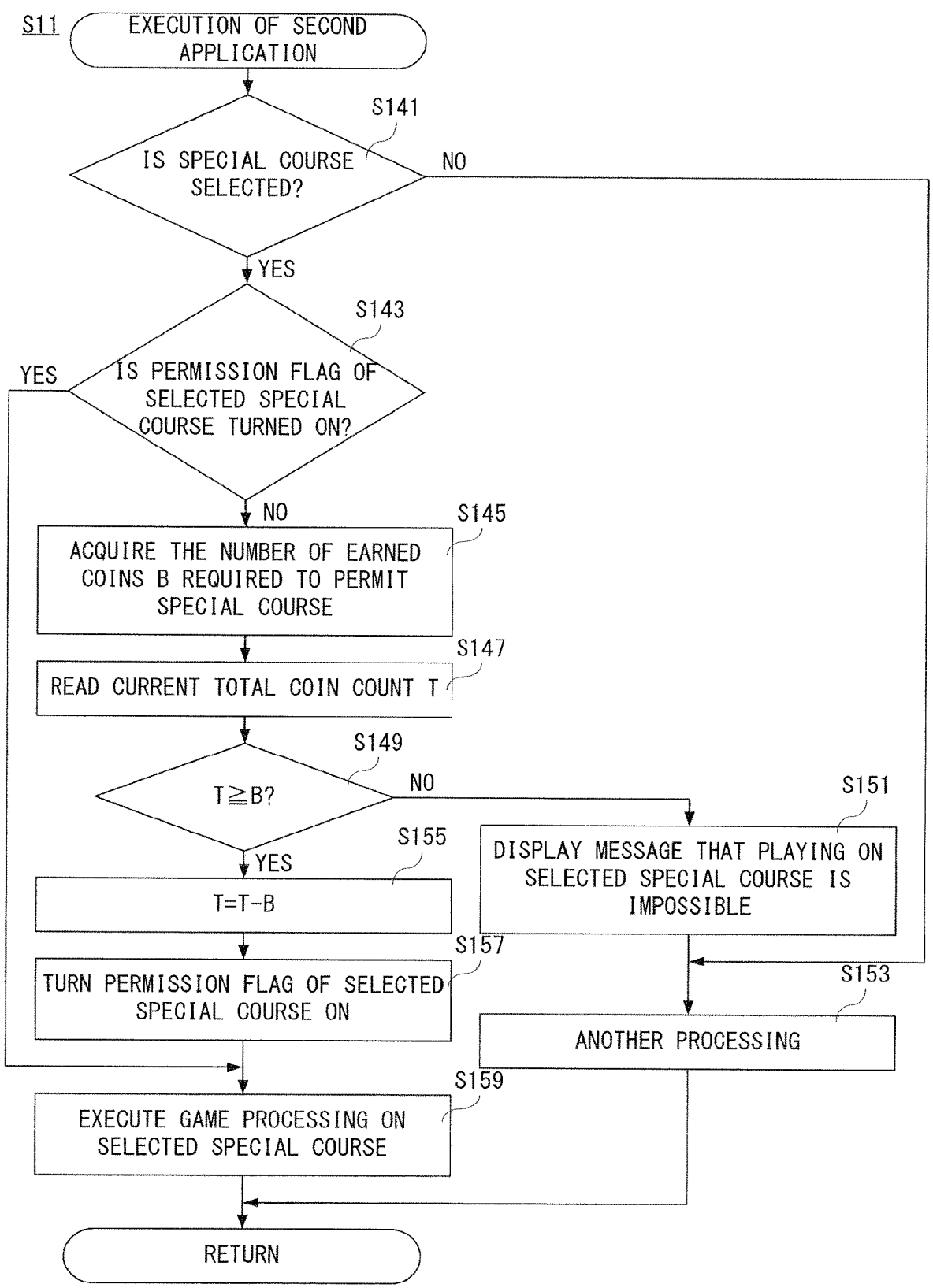
FIG. 16 is a flowchart showing second application executing processing by the CPU shown in FIG. 3.

FIG. 16 is a flowchart showing the second application executing processing in the step S11 shown in FIG. 8. As shown in FIG. 16, when starting the second application executing processing, the CPU 50 determines whether or not the special course is selected in a step S141. Here, the CPU 50 determines whether or not the button image 410 or the button image 412 is turned on on the course selecting screen 400 shown in FIG. 4(C). If "NO" in the step S141, that is, if the special course is not selected, the process proceeds to a step S153 as it is.

On the other hand, if "YES" in the step S141, that is, if the special course is selected, it is determined whether or not the permission flag of the selected special course (special courses A, B in this embodiment) is turned on with reference to the course permission data 106a in a step S143. If "YES" in the step S143, that is, if the permission flag of the selected special course is turned on, the process proceeds to a step S159. On the other hand, if "NO" in the step S143, that is, if the permission flag of the selected special course is turned off, the number of earned coins B that is required to permit the selected special course is acquired in a step S145. Here, the number of earned coins B that is required to permit the special courses A, B is decided in advance. In a next step S147, the current total coin count T is read with reference to the total earned coin count data 1028.

Then, in a step S149, it is determined whether or not the total coin count T is equal to or more than the number of earned coins B. If "NO" in the step S149, that is, if the total coin count T is less than the required number of earned coins B, a message that playing on the selected special course is impossible is displayed in a step S151. Then, in the next step S153, another processing is executed, and the process returns to the entire processing. Here, in the step S153, according to an instruction from the user or the player, the normal course (the first to fourth courses in this embodiment) is selected, or the player character is moved on the selected normal course. Furthermore, the non-player character is moved on the selected normal course according to the control by the computer (CPU 50). In addition, processing according to a game event is executed, processing of outputting a sound (music) is executed, or processing of displaying (updating) the game screen is executed.

On the other hand, if "YES" in the step S149, that is, if the total coin count T is equal to or more than the required number of earned coins B, T−B is set to the total coin count T in a step S155, and the permission flag of the selected special course is turned on in a step S157. Accordingly, the course permission data 106a is updated.

Successively, in the step S159, game processing on the selected special course is executed, and the process returns to the entire processing. Here, according to an instruction from the user or the player, the player character is moved on the selected special course. Furthermore, according to a control by the computer (CPU 50), the non-player character is moved on the selected special course. In addition, processing according to a game event is executed, processing of outputting a sound (music) is executed, or processing of displaying (updating) the game screen is executed.

Here, in this embodiment, an explanation is made only the case that the special courses A, B are selected, but the normal course (the first to fourth courses) is selectable irrespective of the number of earned coins, and thus, the processing of turning the permission flag on, etc. is not required.

Figure 17:
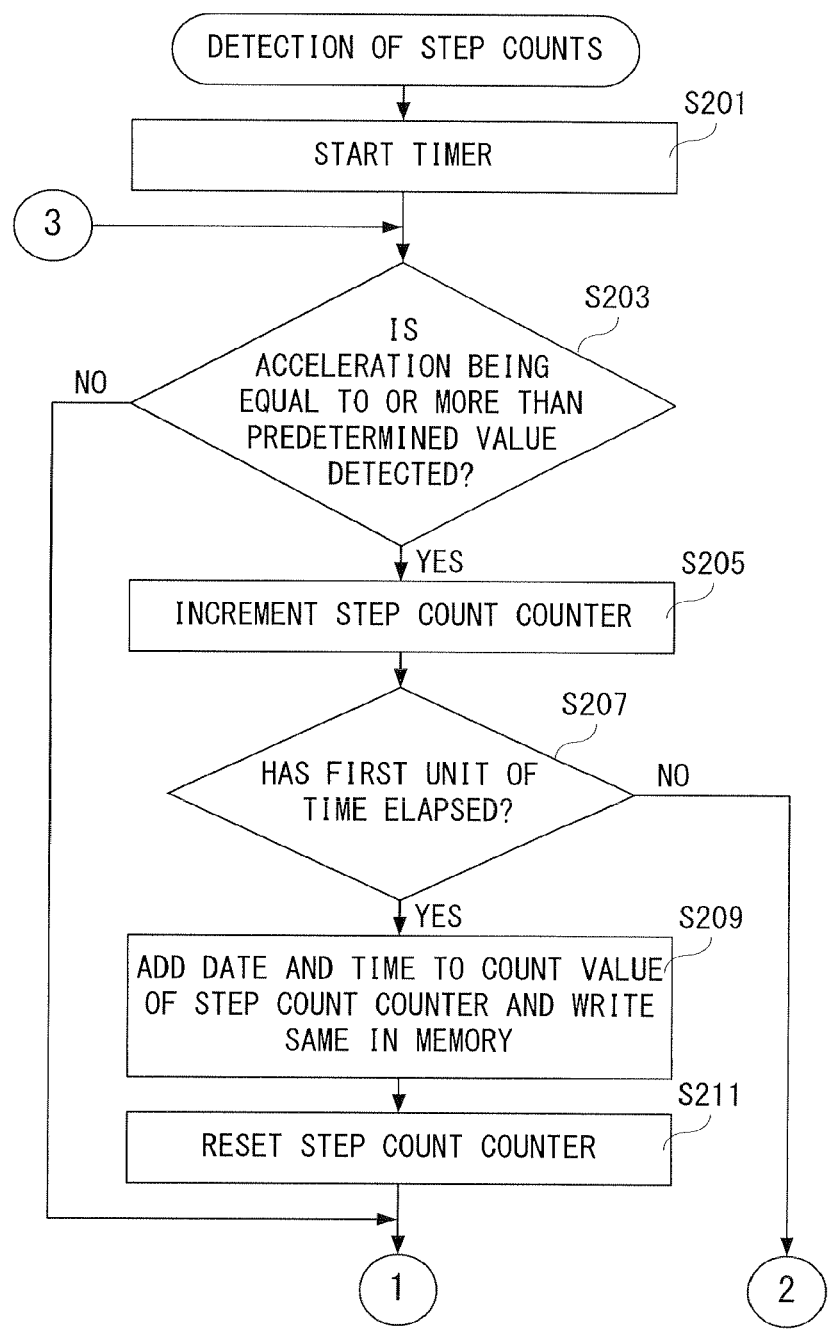
FIG. 17 is a flowchart showing a part of step count detecting processing by the micon shown in FIG. 3.
Figure 18:
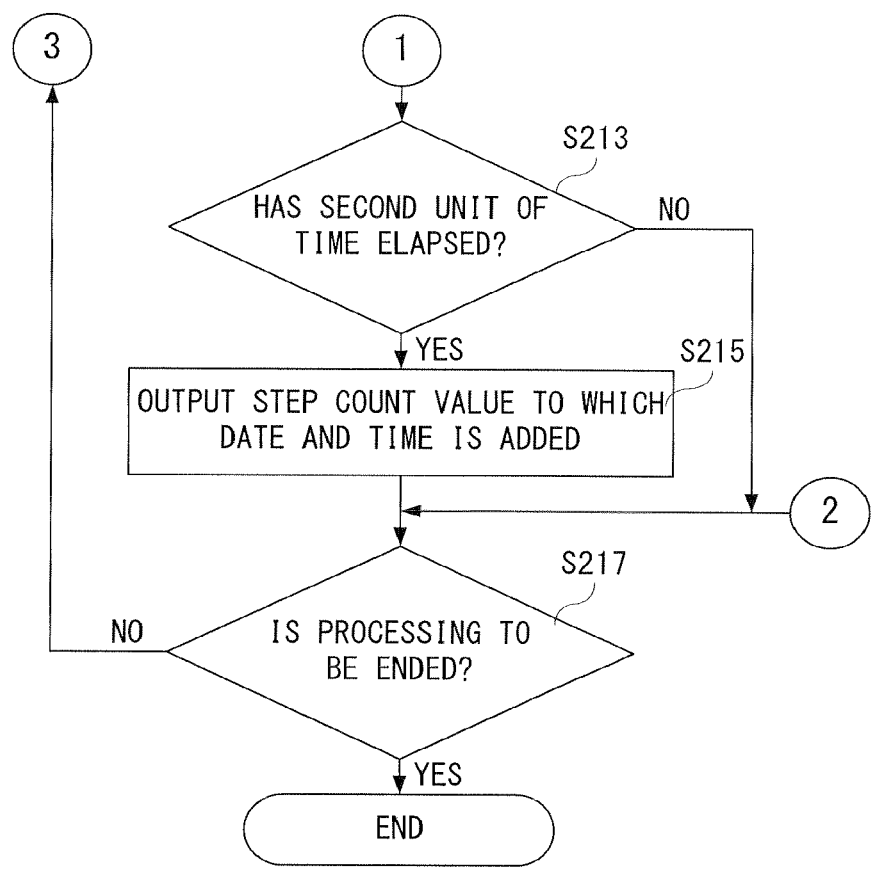
FIG. 18 is a flowchart showing another part of the step count detecting processing by the micon shown in FIG. 3, and sequel to FIG. 17.

FIG. 17 and FIG. 18 is a flowchart showing step count detecting processing by the micon 68. As shown in FIG. 17, when starting the step count detecting processing, the micon 68 starts the timer 152a in a step S201. In a next step S203, it is determined whether or not an acceleration being equal to or more than a predetermined value is detected. If "NO" in the step S203, that is, if an acceleration being equal to or more than a predetermined value is not detected, it is determined that the step counts are not detected, and the process proceeds to a step S213 shown in FIG. 18 as it is. On the other hand, If "YES" in the step S203, that is, if an acceleration being equal to or more than a predetermined value is detected, it is determined that step counts are detected, and the step count counter 152b is incremented in a step S205.

Successively, in a step S207, it is determined whether or not a first unit of time has elapsed. Here, the micon 68 determines whether or not the first unit of time (one hour) has elapsed with reference to the count value of the timer 152a. If "NO" in the step S207, that is, if the first unit of time has not elapsed, the process proceeds to a step S217 shown in FIG. 18 as it is. On the other hand, If "YES" in the step S207, that is, if the first unit of time has elapsed, a date and time is added to the count value of the step count counter 152b, and the added one is written to the memory 68a in a step S209. Here, in the step S209, the n-th step count data

152n is collectively stored for each unit of time. At this time, the micon 68 calculates the date and time (date and time) from the time counted by the RTC 68b, and adds the date and time data corresponding to the calculated date and time to the n-th step count data 152n. In a next step S211, the step count counter 152b is reset, and the process proceeds to the step S213.

As shown in FIG. 18, in the step S213, it is determined whether or not a second unit of time has elapsed. Here, the micon 68 determines whether or not the second unit of time (three hours) has elapsed with reference to the count value of the timer 152a. If "NO" in the step S213, that is, if the second unit of time has not elapsed, the process proceeds to the step S217 as it is. On the other hand, If "YES" in the step S213, that is, if the second unit of time has elapsed, the step count value to which the date and time is added is output to the CPU 50 in a step S215, and the process proceeds to the step S217. That is, even if the game apparatus 10 is in the sleep state, the accumulative step count data 152c is stored (moved) in the memory for saved data 58 every second unit of time. Although illustration is omitted, in the step S215, the micon 68 activates the CPU 50, and controls the power supply circuit 70 according to an instruction from the CPU 50 to start supplying the electric power to the memory controlling circuit 54 and the memory for saved data 56 as described above.

Then, in the step S217, it is determined whether or not the processing is to be ended. Here, the micon 68 determines whether or not there is an end instruction of counting the step count from the CPU 50. Here, strictly, when the opening and closing switch 42 is turned on, the micon 68 activates the clock of the CPU 50, and controls the power supply circuit 70 to start supplying the electric power to each of the circuit components. Then, the CPU 50 that is returned from the sleep state instructs the micon 68 to stop counting the step counts.

If "NO" in the step S217, that is, if it is not to be ended, the process returns to the step S203 shown in FIG. 17 as it is. On the other hand, if "YES" in the step S217, that is, if it is to be ended, the step count detecting processing is ended.

According to this embodiment, the earned coins evaluated through conversion as a correlation value of the step counts are stored in the shared data memory area, and this can commonly be used among a plurality of applications executed by the game apparatuses. Furthermore, other appliances for using the earned coins among the plurality of applications are not required, allowing for an easy usage. In addition, in this embodiment, by merely carrying the game apparatus in the sleep state, it becomes possible to acquire data from other game apparatuses and access points through the in-passing communication, and acquire the special item and play on the special course depending on the number of step counts.

Here, in this embodiment, a game apparatus having an in-passing communication function is explained, but a game apparatus with other functions (applications) may be applicable.

Additionally, in this embodiment, when the main menu screen is displayed, the coin earning processing is executed, but there is no need of being restricted thereto. When the game apparatus makes a transition from the sleep state to the non-sleep state, this may be executed. Alternatively, this may be executed in both cases.

In addition, in this embodiment, in a case that the game apparatus is closed, a transition to the sleep mode is made, but there is no need of being restricted thereto. In a case that there is no operation for a certain period of time (10 minutes, for example) with the main power supply of the game apparatus turned on (normal mode), or in a case that a predetermined operation is executed, a transition to the sleep mode may be made. In such a case, if any operation is executed or if a predetermined operation is executed in the sleep state, a transition (return) to the non-sleep mode (normal mode) may be made.

In addition, in this embodiment, as one example of the power-saving mode, the sleep mode is shown to thereby perform a power control in the game apparatus as described above, but the power of the LCD may be merely turned off.

Furthermore, in this embodiment, the normal item and the special item are displayed on the same screen on which an item to be purchased is selected, but the normal item and the special item may be displayed on the different screens. This holds true for the normal course and the special course.

In addition, in this embodiment, when the special item is selected, the total coin count and the number of earned coins required for purchase are compared to determine whether or not the special item can be purchased. As another embodiment, when the item purchasing screen is displayed, the total coin count and the number of earned coins required for purchase are compared to determine whether or not the special item can be purchased. The special item that cannot be purchased may be non-displayed or grayed out. This holds true for the special course (course selecting screen).

Moreover, the configuration of the game apparatus need not be restricted to that of this embodiment. For example, one camera or no camera may be appropriate. Additionally, the touch panel may be provided on the two LCDs.

Furthermore, in this embodiment, the micon starts or stops counting step counts according to an instruction from the CPU, but the micon may start counting step counts when the opening and closing switch is turned off, and stop counting step counts when the opening and closing switch is turned on.

Additionally, in this embodiment, the earned coin count data out of the shared data memory area is only necessary to be shared with a plurality of applications, and therefore, at least the earned coin count data is included in the shared data memory area, and the accumulative step count data, the previous step count accumulative data, the current step count accumulative data, the previous-time day data and the previous-time day step count data except for it may be included in another memory area (main body-dedicated memory area, for example) that cannot be shared.

In addition, in this embodiment, by opening and closing a foldable game apparatus, the normal mode and the sleep mode are switched. However, a cover capable of being opened and closed to the game apparatus is provided, and by opening and closing the cover, the normal mode and the sleep mode may be switched. Alternatively, a jacket capable of containing the game apparatus is provided, and by taking the game apparatus out from the jacket or putting it in the jacket, the normal mode and the sleep mode can be switched. That is, in a case that the user or the player doe not use the apparatus, the sleep mode may be set to thereby execute an in-passing communication and to count step counts.

In addition, the present invention can be applied to other portable information terminals implementing easy portability, such as cellular phone, a PDA, etc. without being restricted to the handheld game apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A handheld information processing apparatus, comprising:
an electronic device configured to generate data associated with physical activity of a user carrying the electronic device; and
a processing system incorporated within the housing of the handheld information processing apparatus, the processing system having at least one processor and a memory configured to store a plurality of application programs, the processing system configured to:
receive the data associated with the physical activity of the user carrying the electronic device,
store the received data in the memory of the handheld information processing apparatus, the stored data being accessible by the plurality of application programs,
convert the stored data into a correlation value in correlation with the data associated with the physical activity of the user carrying the electronic device,
execute one or more of the plurality of application programs stored in the memory, and
utilize the correlation value in each application program, of the one or more of the plurality of application programs, being executed by the processing system.

2. The handheld information processing apparatus according to claim 1, wherein
said memory has a shared data area accessible to all said plurality of application programs and a plurality of application-dedicated data areas which are respectively set for each application program of said plurality of application programs, and each of said plurality of application-dedicated areas is accessible to only a relevant application program, and
said processing system is further configured to:
store the data associated with the physical activity of the user in said shared data area, and
read the data associated with the physical activity of the user stored in said shared data area, and write update information acquired therefrom to a corresponding application-dedicated data area.

3. The handheld information processing apparatus of claim 1, wherein the electronic device is configured to generate the data associated with the physical activity of the user when the handheld information processing apparatus is in a low-power operation mode.

4. The handheld information processing apparatus according to claim 1, wherein the processing system is further configured to:
determine whether the data associated with the physical activity of the user is above a first number, and
set the data associated with the physical activity of the user to said first number when the data associated with the physical activity of the user is above the first number.

5. The handheld information processing apparatus according to claim 4, wherein the processing system is further configured to:
add date and time information to the data associated with the physical activity of the user carrying the electronic device and store the same in said memory;
determine whether a motion data value acquired by converting the stored data on a same day is above a second number being smaller than said first number; and
accumulate the motion data value by adding said second number when the motion data value acquired on the same day is above the second number.

6. The handheld information processing apparatus according to claim 1, wherein the processing system further configured to:
switch said information processing apparatus between an unused state and a used state,
determine whether said used state switches to said unused state, and
generate the data associated with the physical activity of the user carrying the electronic device when a switch to said unused state is made.

7. The handheld information processing apparatus according to claim 6, wherein the processing system is further configured to:
switch between a power-saving mode and a normal mode, and
determine whether said used state switches to said unused state by determining whether said normal mode changes to said power-saving mode.

8. The handheld information processing apparatus according to claim 6, wherein the processing system is further configured to:
deactivate execution of any one of said plurality of application programs stored in said memory, and
switch from said used state to said unused state in response to said deactivation.

9. The handheld information processing apparatus according to claim 6, wherein
an apparatus main body is configured to be opened and closed,
said apparatus main body is switched between a closed state and an opened state, and
whether said used state switches to said unused state is determined by determining whether said apparatus main body is switched from the opened state to the closed state.

10. The handheld information processing apparatus according to claim 6, further comprising:
a communication device, wherein
said communication device intermittently executes communication processing while the data associated with the physical activity of the user is generated by said electronic device.

11. The handheld information processing apparatus according to claim 1, wherein the processing system is further configured to:
determine whether a condition is satisfied, and
convert the stored data into a motion data value when said condition is satisfied.

12. The handheld information processing apparatus according to claim 1, wherein the electronic device is configured to generate the data associated with the physical activity of the user when a display of the handheld information processing apparatus is inactive.

13. The handheld information processing apparatus according to claim 1, wherein the processing system further configured to transmit data to another information processing apparatus when the handheld information processing apparatus is in an unused state.

14. The handheld information processing apparatus according to claim 1, wherein the memory further includes a shared data area and the correlation value is stored in the shared data area of the memory.

15. The handheld information processing apparatus according to claim 14, wherein the shared data area is configured to be accessible to each application program, of the one or more of the plurality of application programs, for utilizing the correlation value.

16. The handheld information processing apparatus according to claim 14, wherein each application program, of the one or more of the plurality of application programs, utilizes the correlation value stored in the shared data area of the memory to advance each application program.

17. A non-transitory storage medium comprising an information processing program for a handheld information processing apparatus having a memory storing a plurality of application programs and an electronic device configured to generate data associated with physical activity of a user carrying the electronic device, wherein said information processing program causes a computer of said handheld information processing apparatus to:
  receive the data associated with the physical activity of the user carrying the electronic device;
  store the received data in the memory of the handheld information processing apparatus, the stored data being accessible by the plurality of application programs;
  convert the stored data into a correlation value in correlation with the data associated with the physical activity of the user carrying the electronic device;
  execute one or more of the plurality of application programs stored in the memory; and
  utilize the correlation value in each application program, of the one or more of the plurality of application programs, being executed by the information processing apparatus.

18. An information processing method of a handheld information processing apparatus having, at least, a processor, a memory storing a plurality of application programs, and an electronic device, the method comprising:
  receiving data associated with physical activity of a user carrying the electronic device;
  storing the received data in the memory of the handheld information processing apparatus, the stored data being accessible by the plurality of application programs;
  converting the stored data into a correlation value in correlation with the data associated with the physical activity of the user carrying the electronic device;
  executing one or more of the plurality of application programs stored in the memory; and
  utilizing the correlation value in each application program, of the one or more of the plurality of application programs, being executed by the information processing apparatus.

19. An information processing system, comprising:
a processing system having at least one processor and at least one memory configured to store a plurality of application programs, the processing system configured to:
  receive data associated with physical activity of a user carrying an electronic device;
  store the received data in the memory of the information processing system, the stored data being accessible by the plurality of application programs;
  convert the stored data into a correlation value in correlation with the data associated with the physical activity of the user carrying the electronic device;
  execute one or more of the plurality of application programs stored in the memory; and
  utilize the correlation value in each application program, of the one or more of the plurality of application programs, being executed by the processing system.

* * * * *